US007814173B2

(12) United States Patent
Yamagishi et al.

(10) Patent No.: US 7,814,173 B2
(45) Date of Patent: Oct. 12, 2010

(54) INFORMATION-PROCESSING SYSTEM, INFORMATION-PROCESSING APPARATUS AND METHOD, RECORDING MEDIUM AND PROGRAM

(75) Inventors: Yasuaki Yamagishi, Kanagawa (JP); Katsunori Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 11/085,528

(22) Filed: Mar. 22, 2005

(65) Prior Publication Data
US 2005/0234907 A1   Oct. 20, 2005

(30) Foreign Application Priority Data
Mar. 23, 2004  (JP)  ............... 2004-084013

(51) Int. Cl.
*G06F 15/16* (2006.01)
*G06F 7/00* (2006.01)
*G06F 21/00* (2006.01)
(52) U.S. Cl. ................. 709/219; 705/50; 707/705
(58) Field of Classification Search ........... 709/219; 707/57; 705/50
See application file for complete search history.

(56) References Cited

U.S. PATENT DOCUMENTS

| | | | | |
|---|---|---|---|---|
| 6,460,082 | B1 * | 10/2002 | Lumelsky et al. | 709/226 |
| 6,925,469 | B2 * | 8/2005 | Headings et al. | 707/102 |
| 6,970,849 | B1 * | 11/2005 | DeMello et al. | 705/52 |
| 7,028,071 | B1 * | 4/2006 | Slik | 709/201 |
| 7,051,212 | B2 * | 5/2006 | Ginter et al. | 713/193 |
| 7,062,500 | B1 * | 6/2006 | Hall et al. | 707/102 |
| 7,085,741 | B2 * | 8/2006 | Lao et al. | 705/51 |
| 7,171,558 | B1 * | 1/2007 | Mourad et al. | 713/168 |
| 7,213,005 | B2 * | 5/2007 | Mourad et | 705/64 |
| 7,389,273 | B2 * | 6/2008 | Irwin et al. | 705/59 |

(Continued)

FOREIGN PATENT DOCUMENTS

EP  1 540 487 A1  6/2006

(Continued)

OTHER PUBLICATIONS

Ray S. Atarashi, et al., "Metadata and New Challenges", Applications and the Internet Workshops, XP 10644220, Jan. 27, 2003, pp. 395-398.

(Continued)

*Primary Examiner*—William C Vaughn, Jr.
*Assistant Examiner*—Muktesh G Gupta
(74) *Attorney, Agent, or Firm*—Oblon, Spivak, McClelland, Maier & Neustadt, L.L.P.

(57) ABSTRACT

Disclosed herein is an information-processing system including a first information-processing apparatus and a second information-processing apparatus, in which: the first information-processing apparatus has transmission unit for transmitting a metadata utilization condition representing information on rights required for utilizing metadata relevant to a content to the second information-processing apparatus; and the second information-processing apparatus has: reception unit for receiving the metadata utilization condition from the first information-processing apparatus; metadata-processing determination unit for determining whether or not metadata can be processed on the basis of the metadata utilization condition received by the reception unit; and metadata-processing unit for processing the metadata in accordance with the metadata utilization condition if a determination result produced by the metadata-processing determination unit indicates that the metadata can be processed.

15 Claims, 21 Drawing Sheets

U.S. PATENT DOCUMENTS

| | | |
|---|---|---|
| 7,421,411 B2 * | 9/2008 | Kontio et al. .................. 705/52 |
| 7,483,958 B1 * | 1/2009 | Elabbady et al. ............ 709/217 |
| 2003/0014496 A1 * | 1/2003 | Spencer et al. .............. 709/217 |
| 2003/0023564 A1 * | 1/2003 | Padhye et al. .................. 705/54 |
| 2003/0135464 A1 * | 7/2003 | Mourad et al. ................ 705/50 |
| 2004/0168077 A1 * | 8/2004 | Waxman et al. ............. 713/200 |
| 2005/0071280 A1 * | 3/2005 | Irwin et al. .................... 705/59 |
| 2005/0154682 A1 * | 7/2005 | Taylor .......................... 705/71 |

FOREIGN PATENT DOCUMENTS

| | | |
|---|---|---|
| JP | 11-149471 | 6/1999 |
| JP | 2000-10929 | 1/2000 |
| JP | 2002-44356 | 2/2002 |
| JP | 2002-176419 | 6/2002 |
| JP | 2002-300158 | 10/2002 |
| JP | 2004-40741 | 2/2004 |
| KR | 2004-0024835 | 3/2004 |
| WO | WO 2004/025489 A1 | 3/2004 |

OTHER PUBLICATIONS

Chih-Fu Chang, et al., "Overview of the MPEG-7 Standard", IEEE Transactions on Circuits and Systems for Video Technology, XP 11014207, vol. 11, No. 6, Jun. 2001, pp. 688-695.

Junichi Suzuki, et al., "An Implementation of Metadata Exchange Services Over IP Network", Information Processing Society of Japan Memoir, 2003-AVM-40, vol. 2003, No. 24, Mar. 7, 2003, pp. 61-66 with English Abstract.

Masanori Sano, et al., "A Study on MPEG-7 Application System FIT2002 Information science and technology forum Public lecture memoirs Second separate volume Database Natural language/document voice / music Artificial intelligence", Information Processing Society of Japan, Sep. 13, 2002, pp. 43-44.

* cited by examiner

FIG. 5

```
METADATA ID
USER OWNING THE RIGHT TO USE CONTENTS: (THE NAME OF A USER
GRANTED SUCH A RIGHT OR THE NAME OF A CLASS OF SUCH USERS)
ELEMENTS OF OPERATIONS: (ELEMENT NAMES)
CONDITION FOR EXERCISING THE RIGHT TO USE A CONTENT:
DEVICE SECURITY CLASS: LEVEL X
OPERATION CLASS: STORED IN A DISK
```

FIG. 6

| SECURITY LEVEL | CONFIGURATION ELEMENT |
|---|---|
| LEVEL 1 | SECURE MEMORY |
| LEVEL 2 | SECURE MEMORY + SECURE HARD DISK |
| LEVEL 3 | SECURE MEMORY + ORDINARY HARD DISK |
| LEVEL 4 | ORDINARY MEMORY + SECURE HARD DISK |

FIG. 8

```
 ......
1:<?xml version="1.0"encoding="UTF-8"?>
2:<license xmlns="urn:abc:contentsLicense"
3:         xmlns:xsi="http://www.w3.org/2001/XMLSchema-instance"
4:         xsi:schemaLocation="urn:abc:contentsLicense
5:             http://www.abc.com/contentsLicense.xsd">
6:         <inventory>
7:             <digitalResource licensePartId="targetContent">
8:                 <nonSecureIndirect URI="urn:xyz:contents1"/>
9:             </digitalResource>
10:        </inventory>
11:        <grantGroup>
12:            <user deviceID="stb1.abc.co.jp"/>
13:            <grant>
14:                <play/>
15:                <digitalResource licensePartIdRef="targetContent"/>
16:                <allConditions>
17:                    <validityInterval>
18:                        <notBefore>2003-11-15T04:03:02</notBefore>
19:                        <notAfter>2003-12-06T04:03:02</notAfter>
20:                    </validityInterval>
21:                </allConditions>
22:            </grant>
23:            <grant>
24:                <copy/>
25:                <digitalResource licensePartIdRef="targetContent"/>
26:                <allConditions>
27:                    <count>1</count>
28:                    <recordingMedia>
29:                        <memoryStick/>
30:                    </recordingMedia>
31:                </allConditions>
32:            </grant>
33:        </grantGroup>
34:</license>
 ......
```

FIG. 9

```
 1: <?xml version="1.0" encoding="UTF-8"?>
 2: <Policy xmlns="urn:oasis:names:tc:xacml:1.0:policy"
 3:    xmlns:xsi="http://www.w3.org/2001/XMLSchema-instance"
 4:    xsi:schemaLocation="urn:oasis:names:tc:xacml:1.0:policy
         http://www.oasis-open.org/tc/xacml/1.0/cs-xacml-schema-policy-01.xsd"
 5:    PolicyId="urn:metadataAccessControlPolicy1"
 6:    RuleCombiningAlgId="urn:oasis:names:tc:xacml:1.0:rule-combining-algorithm:deny-overrides">
 7:    <Target>
 8:       <Subjects><AnySubject/></Subjects>
 9:       <Resources><AnySubject/></Resources>
10:       <Actions><AnyAction/></Actions>
11:    </Target>
12:    <Rule RuleId="urn:metadtaAccessControlRule1"Effect="Permit">
13:       <Target>
14:          <Subjects>
15:             <Subject>
16:                <SubjectMatch MatchId="urn:oasis:names:tc:xacml:1.0:function:rfc822Name-match">
17:                   <SubjectAttributeDesignator
18:                      AttributeId="urn:oasis:names:tc:xacml:1.0:subject:subject-id"
19:                      DataType="rfc822Name"/>
20:                   <AttributeValue
21:                      DataType="rfc822Name">abc.co.jp</AttributeValue>
22:                </SubjectMatch>
23:
```

F I G. 1 0

```
24: <SubjectMatch MatchId="urn:oasis:names:tc:xacml:1.0:function:string-equal">
25:   <SubjectAttributeDesignator
26:     AttributeId="urn:abc:xacml:subject:group"
27:     DataType="http://www.w3.org/2001/XMLSchema#string"/>
28:   <AttributeValue>subscriberGroup1</AttributeValue>
29: </SubjectMatch>
30: <SubjectMatch MatchId="urn:oasis:names:tc:xacml:1.0:function:string-equal">
31:   <SubjectAttributeDesignator
32:     AttributeId="urn:abc:xacml:subject:deviceSecurityLevel"
33:     DataType="http://www.w3.org/2001/XMLSchema#string"/>
34:   <AttributeValue>level1</AttributeValue>
35: </SubjectMatch>
36: </Subject>
37: </Subjects>
38: <Resources>
39: <Resource>
40:   <ResourceMatch MatchId="urn:oasis:names:tc:xacml:1.0:function:anyURI-equal">
41:     <ResourceAttributeDesignator
42:       AttributeId="urn:abc:xacml:resource:resource-uri"
43:       DataType="http://www.w3.org/2001/XMLSchema#anyURI"/>
44:     <AttributeValue>
45:       file://localhost/metadataInstanceRepository/metadataInstance1.xml
46:     </AttributeValue>
47:   </ResourceMatch>
48: </Resource>
49: </Resources>
```

FIG. 11

```
50: <Actions>
51: <Action>
52:   <ActionMatch MatchId="urn:oasis:names:tc:xacml:1.0:function:string-equal">
53:     <ActionAttributeDesignator
54:       AttributeId="urn:abc:xacml:action"
55:       DataType="http://www.w3.org/2001/XMLSchema#string"/>
56:     <AttributeValue>read</AttributeValue>
57:   </ActionMatch>
58: </Action>
59: </Actions>
60: </Target>
61: </Rule>
62: </Policy>
......
```

FIG. 12

Title: TITLE
Synopsis: OUTLINE
Keyword: KEYWORD
Genre: GENRE
ParentalRating: PARENTAL RATING
Language: LANGUAGE
CastList: LIST OF PERFORMERS
RelatedMaterial: RELEVANT CONTENTS
ProductionYear: PRODUCTION YEAR
ProductionCountry: PRODUCTION COUNTRY
Review: REVIEW/EVALUATION

FIG. 13

LocationURL: URL
Format: ENCODING FORMAT
StartDate/EndDate: DISTRIBUTION (ACQUISITION)
 START AND END TIMES

FIG. 14

```
Title: TITLE
Synopsis: OUTLINE
Keyword: KEYWORD
KeyFrame: KEY FRAME
SegmentLocation: SEGMENT START/END TIMES
```

FIG. 15

```
Title: TITLE
Synopsis: OUTLINE
Keyword: KEYWORD
Genre: GENRE
ParentalRating: PARENTAL RATING
Language: LANGUAGE
CastList: LIST OF PERFORMERS
RelatedMaterial: RELEVANT CONTENTS
ProdustionYear: PRODUCTION YEAR
ProductionCountry: PRODUCTION COUNTRY
Review: REVIEW/EVALUATION
GroupElement: GROUP ELEMENT
```

INFORMATION-PROCESSING SYSTEM, INFORMATION-PROCESSING APPARATUS AND METHOD, RECORDING MEDIUM AND PROGRAM

BACKGROUND OF THE INVENTION

The present invention relates to an information-processing system, an information-processing apparatus, an information-processing method, a recording medium and a program. More particularly, the present invention relates to an information-processing system capable of qualifying terminals included in the information-processing system as terminals allowed to utilize metadata relevant to a content in dependence on the metadata, an information-processing apparatus employed in the information-processing system, an information-processing method adopted by the information-processing apparatus, a program prescribing the information-processing method and a recording medium for storing the program.

In utilization of metadata relevant to broadcast contents in terminals, in dependence on the substance of the metadata, the content-broadcasting enterprise sets forth a requirement to distinguish terminals each having a processing system capable of processing data at a high level of security from terminals each having a processing system incapable of processing data at any level of security. In this case, the broadcast contents include contents distributed by broadcast waves and contents distributed by way of an IP network.

In accordance with such a requirement, metadata to be handled at a high level of security is treated in the same way as a content and protected, stored and subjected to reproduction control by a DRM (Digital Rights Management) in the same way as a content to be handled as a content to be treated at a high level of security. That is to say, metadata to be handled at a high level of security is encrypted by using a content key for encrypting a content in the same way as the content. As an alternative, metadata is encrypted by using a key for encrypting the content key. For more information, refer to patent reference 1: Japanese Patent Laid-open No. 2002-101086.

In actuality, however, metadata is generally treated by execution of a procedure different from that for contents. For example, in a user terminal, a plurality of different kinds of metadata is acquired before a content and stored in a database in advance to be searched prior to utilization in many cases.

That is to say, metadata is decrypted only when the metadata is subjected to reproduction and display control. Thus, unlike a content with protected security, it is not until a request for search of a content that metadata is decrypted and exposed to the user. However, it is difficult to provide hardware for decrypting and exposing metadata not before a request for search of a content is made. Thus, metadata had rather be decrypted and stored in a database in advance.

In order to protect the security of metadata, however, it is necessary to store a database including a plurality of pieces of metadata in an expensive secure memory in advance in the same way as protection of contents. From a hardware point of view, however, it is difficult to store such a database in an expensive secure memory in advance in the same way as protection of contents. In this case, it is possible to provide an apparatus having a configuration in which a database area for storing metadata is added to a tamper-proof secure memory to be used in conjunction with a secondary storage device such as a secure hard disk. In general, however, it is also difficult to procure a secure hard disk due to a high-cost reason. Even if a secondary storage device such as a secure hard disk can be obtained, in many cases, the data-security protection provided by the secondary storage device is inferior to that of a secure memory.

In spite of the fact that it is necessary to handle metadata and contents by separating the conditions themselves for utilizing the metadata and contents in processing carried in a user terminal from each other, the metadata requiring a high level of security protection is treated in a user terminal in the same way as a content requiring a high level of security protection. In consequence, metadata raises a problem of an excessively high cost of handling the metadata or deterioration of the security protection.

In addition, the broadcast-content enterprise imposes a requirement to classify protection of copyrights by metadata type instead of a requirement to distinguish metadata and contents from each other. To put it concretely, the imposed requirement requires that only a terminal offering security protection at the same level as protection of security for contents be allowed to process information such as segment metadata describing that a content is divided into a plurality of segments and only highlight scenes are subjected to digest reproduction. As described above, however, in accordance with the conventional method, metadata is classified only on the basis of whether or not the metadata requires security protection. Thus, the conventional method has a problem of an inability to finely set the level of security for protection of copyrights in accordance with the types of metadata.

SUMMARY OF THE INVENTION

It is thus an object of the present invention, which addresses the problems described above, to restrict utilization of metadata in accordance with conditions separate from conditions for utilizing contents.

An information-processing system provided by the present invention is characterized in that the information-processing system comprises:

a first information-processing apparatus having transmission unit for transmitting a metadata utilization condition representing information on rights required for utilizing metadata relevant to a content to a second information-processing apparatus; and the second information-processing apparatus having:

reception unit for receiving the metadata utilization condition from the first information-processing apparatus;

metadata-processing determination unit for determining whether or not metadata can be processed on the basis of the metadata utilization condition received by the reception unit; and metadata-processing unit for processing the metadata in accordance with the metadata utilization condition if a determination result produced by the metadata-processing determination unit indicates that the metadata can be processed.

It is possible to provide the information-processing system with a configuration in which the metadata utilization condition is a metadata identifier or a condition relevant to a target person, who is allowed to utilize metadata or has a right to use the metadata, a device security level or operations.

It is possible to provide the information-processing system with a configuration in which the second information-processing apparatus further has:

content-processing determination unit for determining whether or not a content can be processed on the basis of a content utilization condition representing information on rights required for utilizing the content; and content-processing unit for processing the content in accordance with the content utilization condition if a determination result produced by the content-processing determination unit indicates that the content can be processed.

It is possible to provide the information-processing system with a configuration in which the metadata-processing unit further includes:

metadata decryption unit for decrypting metadata; and storage control unit for controlling an operation to store the metadata decrypted by the metadata-decryption unit.

An information-processing apparatus provided by the present invention is characterized in that the information-processing apparatus comprises:

reception unit for receiving a metadata utilization condition representing information on rights required for utilizing metadata relevant to a content from another information-processing apparatus;

metadata-processing determination unit for determining whether or not metadata can be processed on the basis of the metadata utilization condition received by the reception unit; and metadata-processing unit for processing the metadata in accordance with the metadata utilization condition if a determination result produced by the metadata-processing determination unit indicates that the metadata can be processed.

It is possible to provide the information-processing apparatus with a configuration in which the metadata utilization condition is a metadata identifier or a condition relevant to a target person, who is allowed to utilize metadata or has a right to use the metadata, a device security level or operations.

It is possible to provide the information-processing apparatus with a configuration in which the information-processing apparatus further has:

content-processing determination unit for determining whether or not a content can be processed on the basis of a content utilization condition representing information on rights required for utilizing the content; and content-processing unit for processing the content in accordance with the content utilization condition if a determination result produced by the content-processing determination unit indicates that the content can be processed.

It is possible to provide the information-processing apparatus with a configuration in which the metadata-processing unit includes:

metadata-decryption unit for decrypting metadata; and storage control unit for controlling an operation to store the metadata decrypted by the metadata decryption unit.

An information-processing method provided by the present invention is characterized in that the information-processing method comprises:

a reception step of receiving a metadata utilization condition from another information-processing apparatus;

a metadata-processing determination step of determining whether or not metadata can be processed on the basis of the metadata utilization condition received in processing carried out at the reception step; and a metadata-processing step of processing the metadata in accordance with the metadata utilization condition if a determination result produced by processing carried out at the metadata-processing determination step indicates that the metadata can be processed.

A recording medium provided by the present invention as a medium for recording a program is characterized in that the program comprises:

a reception step of receiving the metadata utilization condition from another information-processing apparatus;

a metadata-processing determination step of determining whether or not metadata can be processed on the basis of the metadata utilization condition received in processing carried out at the reception step; and a metadata-processing step of processing the metadata in accordance with the metadata utilization condition if a determination result produced by processing carried out at the metadata-processing determination step indicates that the metadata can be processed.

A program provided by the present invention is characterized in that the program comprises:

a reception step of receiving the metadata utilization condition from another information-processing apparatus;

a metadata-processing determination step of determining whether or not metadata can be processed on the basis of the metadata utilization condition received in processing carried out at the reception step; and a metadata-processing step of processing the metadata in accordance with the metadata utilization condition if a determination result produced by processing carried out at the metadata-processing determination step indicates that the metadata can be processed.

In an information-processing system provided as a first invention, a first information-processing apparatus transmits a metadata utilization condition representing information on rights required for utilizing metadata relevant to a content to a second information-processing apparatus, whereas the second information-processing apparatus receives the metadata utilization condition from the first information-processing apparatus, determines whether or not metadata can be processed on the basis of the received metadata utilization condition and processes the metadata in accordance with the metadata utilization condition if a determination result indicates that the metadata can be processed.

In the second information-processing apparatus provided as a second invention, a metadata utilization condition is received from the first information-processing apparatus and used as a basis for determining whether or not metadata can be processed, and then, the metadata is processed in accordance with the metadata utilization condition if a determination result indicates that the metadata can be processed.

In accordance with the present invention, use of metadata can be restricted by a condition separate from a condition for utilizing a content.

BRIEF DESCRIPTION OF THE DRAWINGS

FIG. 5 is a diagram showing a typical data structure of metadata;

FIG. 6 is an explanatory diagram showing relations between configuration elements of a metadata DB and security levels;

FIG. 8 is a diagram showing a typical data structure of a content utilization condition;

FIG. 9 is a diagram showing a typical data structure of a metadata utilization condition;

FIG. 10 is a diagram showing a continuation of the typical data structure of a metadata utilization condition shown in FIG. 9;

FIG. 11 is a diagram showing a continuation of that shown in FIG. 10 as a further continuation of the typical data structure of a metadata utilization condition shown in FIG. 9;

FIG. 12 is a diagram showing a typical data structure of program metadata;

FIG. 13 is a diagram showing a typical data structure of program-location metadata;

FIG. 14 is a diagram showing a typical data structure of segmentation metadata;

FIG. 15 is a diagram showing a typical data structure of program-group metadata;

DETAILED DESCRIPTION OF THE PREFERRED EMBODIMENTS

Figure 1:
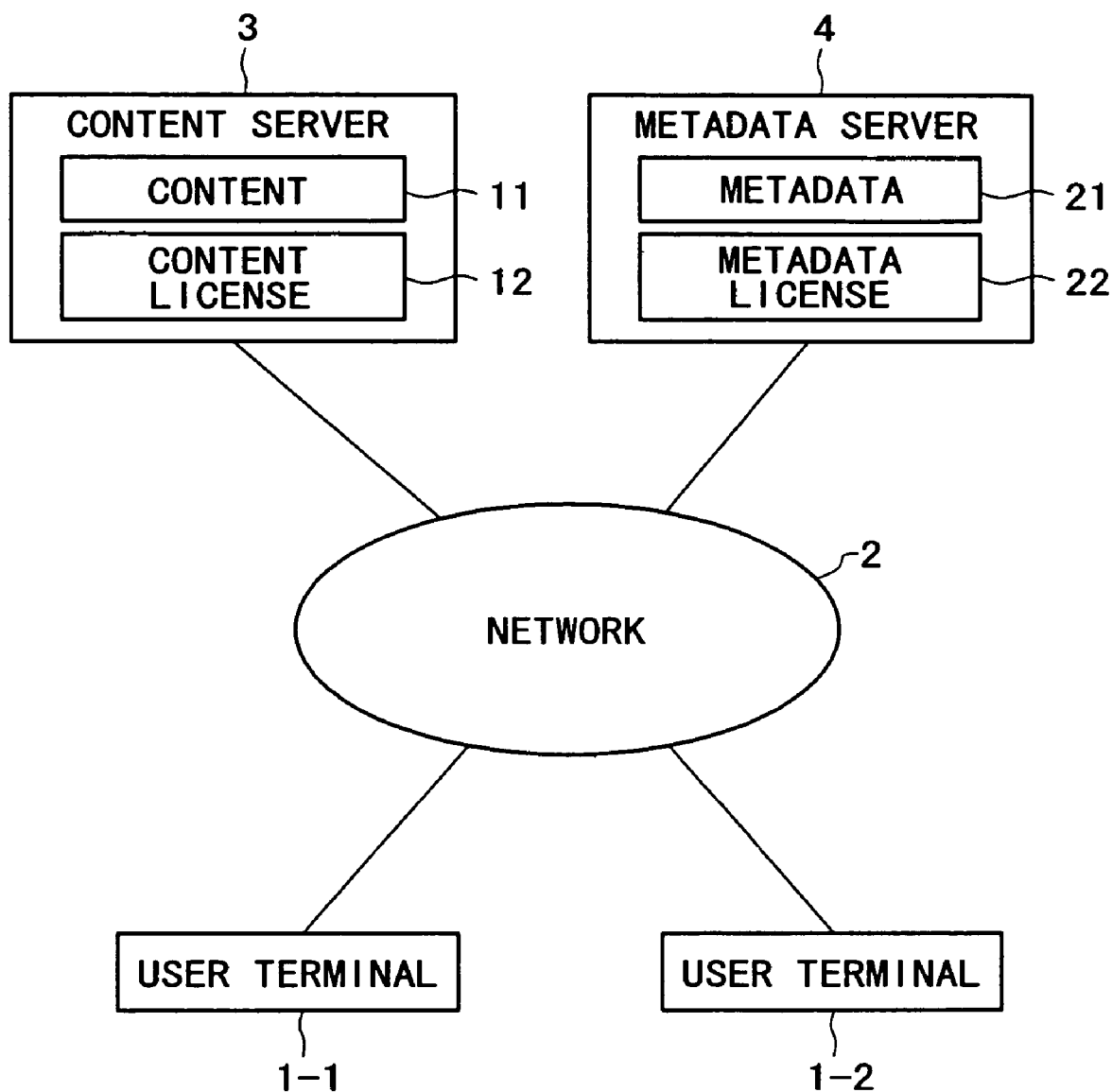
FIG. 1 is a diagram showing a typical configuration of a content-providing system provided by the present invention.

Before explaining preferred embodiments of the present invention, relations between configuration elements described in claims and configuration elements of the embodiments are shown in a description given below. The description is given to verify that concrete examples supporting the invention described in the claims are described in the embodiments of the present invention. Even through there may be a concrete example described in an embodiment of the present invention but not included in the following description as a configuration element corresponding to a configuration element described in a claim, the following description should not be interpreted as a description excluding the concrete example from embodiment configuration elements each corresponding to a configuration element described in a claim. Conversely, even though the following description may include a concrete example as an embodiment configuration element corresponding to a specific configuration element described in a claim, the following description should not be interpreted as a description implying that the concrete example is an embodiment configuration element not corresponding to a configuration element described in a claim as a configuration element other than the specific configuration element.

In addition, inventions corresponding to concrete examples described in the embodiments of the invention are not all described in the claims. In other words, the following description explains only inventions corresponding to concrete examples described in the embodiments of the present invention. The following description should not be interpreted as a description denying the existence of an invention not described in a claim appended to this specification. That is to say, the following description should not be interpreted as a description denying the existence of an invention to be filed separately in the future or added as an invention included in a written amendment.

Figure 3:
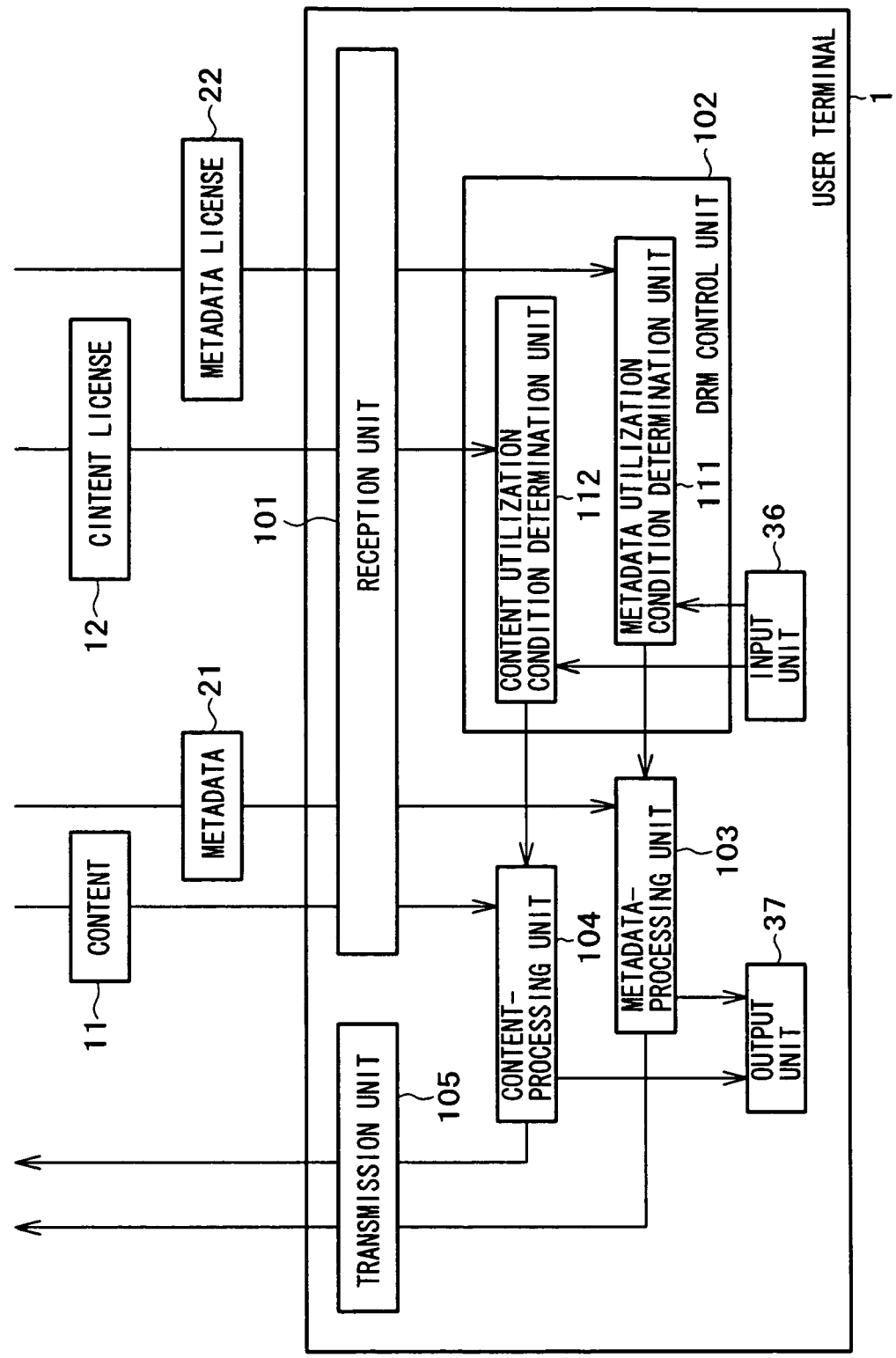
FIG. 3 is a block diagram showing a typical functional configuration of the user terminal employed in the content-providing system shown in FIG. 1.

An information-processing system according to claim 1 is characterized in that the information-processing system comprises:

a first information-processing apparatus (such as a metadata server 4 shown in FIG. 1) having transmission unit (such as a communication unit 39 shown in FIG. 2) for transmitting a metadata utilization condition (such as a metadata license 22 shown in FIG. 1) representing information on rights required for utilizing metadata (such as metadata 21 shown in FIG. 1) relevant to a content (such as a content 11 shown in FIG. 1) to a second information-processing apparatus; and the second information-processing apparatus (such as a user terminal 1-1 shown in FIG. 1) having:

reception unit (such as a reception unit 101 shown in FIG. 3) for receiving the metadata utilization condition from the first information-processing apparatus;

metadata-processing determination unit (such as a metadata utilization determination unit 111 shown in FIG. 3) for determining whether or not metadata can be processed on the basis of the metadata utilization condition received by the reception unit; and metadata-processing unit (such as a metadata-processing unit 103 shown in FIG. 3) for processing the metadata in accordance with the metadata utilization condition if a determination result produced by the metadata-processing determination unit indicates that the metadata can be processed.

An information-processing system according to claim 3 is characterized in that the second information-processing apparatus further has:

content-processing determination unit (such as a content utilization condition determination unit 112 shown in FIG. 3) for determining whether or not a content (such as the content 11 shown in FIG. 1) can be processed on the basis of a content utilization condition (such as the content license 12 shown in FIG. 3) representing information on rights required for utilizing the content; and content-processing unit (such as a content-processing unit 104 shown in FIG. 3) for processing the content in accordance with the content utilization condition if a determination result produced by the content-processing determination unit indicates that the content can be processed.

An information-processing system according to claim 4 is characterized in that the metadata-processing unit further includes:

metadata decryption unit (such as a metadata decryption unit 211 shown in FIG. 4) for decrypting metadata; and storage control unit (such as a metadata DB 212 shown in FIG. 4) for controlling an operation to store the metadata decrypted by the metadata decryption unit.

An information-processing apparatus according to claim 5 is characterized in that the information-processing apparatus comprises:

reception unit (such as the reception unit 101 shown in FIG. 3) for receiving the metadata utilization condition (such as the metadata license 22 shown in FIG. 1) representing information on rights required for utilizing metadata (such as the metadata 21 shown in FIG. 1) relevant to a content (such as the content 11 shown in FIG. 1) from another information-processing apparatus (such as the metadata server 4 shown in FIG. 1);

metadata-processing determination unit (such as the metadata utilization condition determination unit 111 shown in FIG. 3) for determining whether or not metadata can be processed on the basis of the metadata utilization condition received by the reception unit; and metadata-processing unit (such as the metadata-processing unit 103 shown in FIG. 3) for processing the metadata in accordance with the metadata utilization condition if a determination result produced by the metadata-processing determination unit indicates that the metadata can be processed.

An information-processing apparatus according to claim 7 is characterized in that the information-processing apparatus further has:

content-processing determination unit (such as the content utilization condition determination unit 112 shown in FIG. 3) for determining whether or not a content (such as the content 11 shown in FIG. 1) can be processed on the basis of a content utilization condition (such as the content license 12 shown in FIG. 3) representing information on rights required for utilizing the content; and content-processing unit (such as the content-processing unit 104 shown in FIG. 3) for processing the content in accordance with the content utilization condition if a determination result produced by the content-processing determination unit indicates that the content can be processed.

An information-processing apparatus according to claim 8 is characterized in that the metadata-processing unit has:

metadata-decryption unit (such as the metadata decryption unit 211 shown in FIG. 4) for decrypting metadata; and storage control unit (such as the metadata DB 212 shown in FIG. 4) for controlling an operation to store the metadata decrypted by the metadata decryption unit.

An information-processing method according to claim 9 is characterized in that the information-processing method comprises:

a reception step (such as a step S41 of a flowchart shown in FIG. 18) of receiving a metadata utilization condition (such as the metadata license 22 shown in FIG. 1) representing information on rights required for utilizing metadata (such as the metadata 21 shown in FIG. 1) relevant to a content (such as the content 11 shown in FIG. 1) from another information-processing apparatus (such as the metadata server 4 shown in FIG. 1);

a metadata-processing determination step (such as a step S44 of the flowchart shown in FIG. 18) of determining whether or not metadata can be processed on the basis of the metadata utilization condition received in processing carried out at the reception step; and a metadata-processing step (such as a step S46 of the flowchart shown in FIG. 18) of processing the metadata in accordance with the metadata utilization condition if a determination result produced by processing carried out at the metadata-processing determination step indicates that the metadata can be processed.

It is to be noted that a recording medium according to claim 10 and a program according to claim 11 each have the same configuration as the information-processing method described above as an information-processing method according to claim 9. Thus, descriptions of the recording medium according to claim 10 and the program according to claim 11 are omitted to avoid redundancy.

Embodiments of the present invention are described by referring to diagrams as follows.

FIG. 1 is a diagram showing a typical configuration of a content-providing system applying the present invention. User terminals 1-1 and 1-2, which are each generally a personal computer or the like, are connected to a network 2 implemented typically by the Internet. In the following description, the user terminals 1-1 and 1-2 are each generically referred to simply as the user terminal 1 unless there is a need to distinguish the user terminals 1-1 and 1-2 from each other. In this embodiment, only the 2 user terminals 1-1 and 1-2 are connected. In actuality, however, any number of user terminals can be connected to the network 2.

In addition, a content server 3 and a metadata server 4 are also connected to the network 2. By the same token, any number of content servers 3 and any number of metadata servers 4 can be connected to the network 2.

The content server 3 is used for storing contents 11 with their copyrights requiring protection and content licenses 12. The contents 11 are received from content providers not shown in the figure. A content license 12 includes a content utilization condition required for utilizing a content 11 for which the content license 12 is provided. The content server 3 transmits contents 11 and content licenses 12 to the user terminal 1 by way of the network 2. The content utilization condition of a content 11 typically includes a content ID (content identifier) of the content 11, a user owning the right to use the content 11 and a condition for exercising the right to use the content 11. The condition for exercising the right to use the content 11 typically includes operations that a user owning the right to use the content 11 is allowed to carry out, the time limit of an operation and the number of times the user is allowed to carry out the operation. By a user owning the right to use a content 11, a user granted such a right or a group of such users is meant.

The metadata server 4 is used for storing metadata 21 relevant to contents provided by the content server 3 and metadata licenses 22 each including a metadata utilization condition necessary for utilizing metadata 21. A metadata provider not shown in the figure provides the metadata 21 to the metadata server 4. The metadata server 4 transmits metadata 21 and a metadata license 22 to the user terminal 1 by way of the network 2.

The metadata 21 is general information on a content 11 and is independent on the release and broadcast format of the content 11. The metadata 21 typically includes the title, substance and genre of the content 11 and is used for searching for the content 11. The metadata utilization condition of metadata 21 typically includes a metadata ID (metadata identifier) of the metadata 21, a user owning the right to use the metadata 21 and a condition for exercising the right to use the metadata 21. The condition for exercising the right to use metadata 21 typically includes operations that a user owning the right to use the metadata 21 is allowed to carry out, the time limit of an operation, the number of times the user is allowed to carry out the operation and a security level at which the user terminal 1 processes the metadata 21. By a user owning the right to use metadata 21, a user granted such a right or a group of such users is meant.

Receiving metadata 21 and a metadata license 22 from the metadata server 4, the user terminal 1 decrypts the received metadata 21 in accordance with a metadata utilization condition included in the metadata license 22 to result in decrypted metadata 21. When the user requests the user terminal 1 to search for a content 11, the user terminal 1 carries out an operation to search for the desired content 11 by using the metadata 21 decrypted in accordance with the metadata utilization condition as the metadata 21 relevant to the content 11. Then, when the user requests the user terminal 1 to reproduce the content 11 found in the search, the user terminal 1 decrypts the content 11 in accordance with a content utilization condition included in the content license 12 of the content 11 and reproduces the decrypted content 11.

As described above, in the content-providing system shown in FIG. 1, in addition to a content license 12, the user terminal 1 is provided with a metadata license 22 necessary for utilizing metadata 21. Metadata 21 is processed on the basis of a metadata license 22 for the metadata 21 whereas a content 11 is processed on the basis of a content license 12 for the content 11.

As described above, in the embodiment shown in FIG. 1, the content server 3 provides contents 11 and their content licenses 12 to the user terminal 1 while the metadata server 4 provides metadata 21 and its metadata licenses 22 to the user terminal 1. It is to be noted, however, that the method to provide contents 11, content licenses 12, metadata 21 and metadata licenses 22 is not limited to the embodiment shown in FIG. 1. For example, contents 11, content licenses 12, metadata 21 and metadata licenses 22 can also be received from the same server. As an alternative, contents 11, content licenses 12, metadata 21 and metadata licenses 22 can also be received from different servers.

It is needless to say that, as described above, the user terminal 1 can be implemented by a personal computer. However, the user terminal 1 can also be implemented by a portable phone, a PDA (Personal Digital Assistant), an AV (Audio Visual) device and a CE (consumer electronic) device such as a home electronic device.

Figure 2:
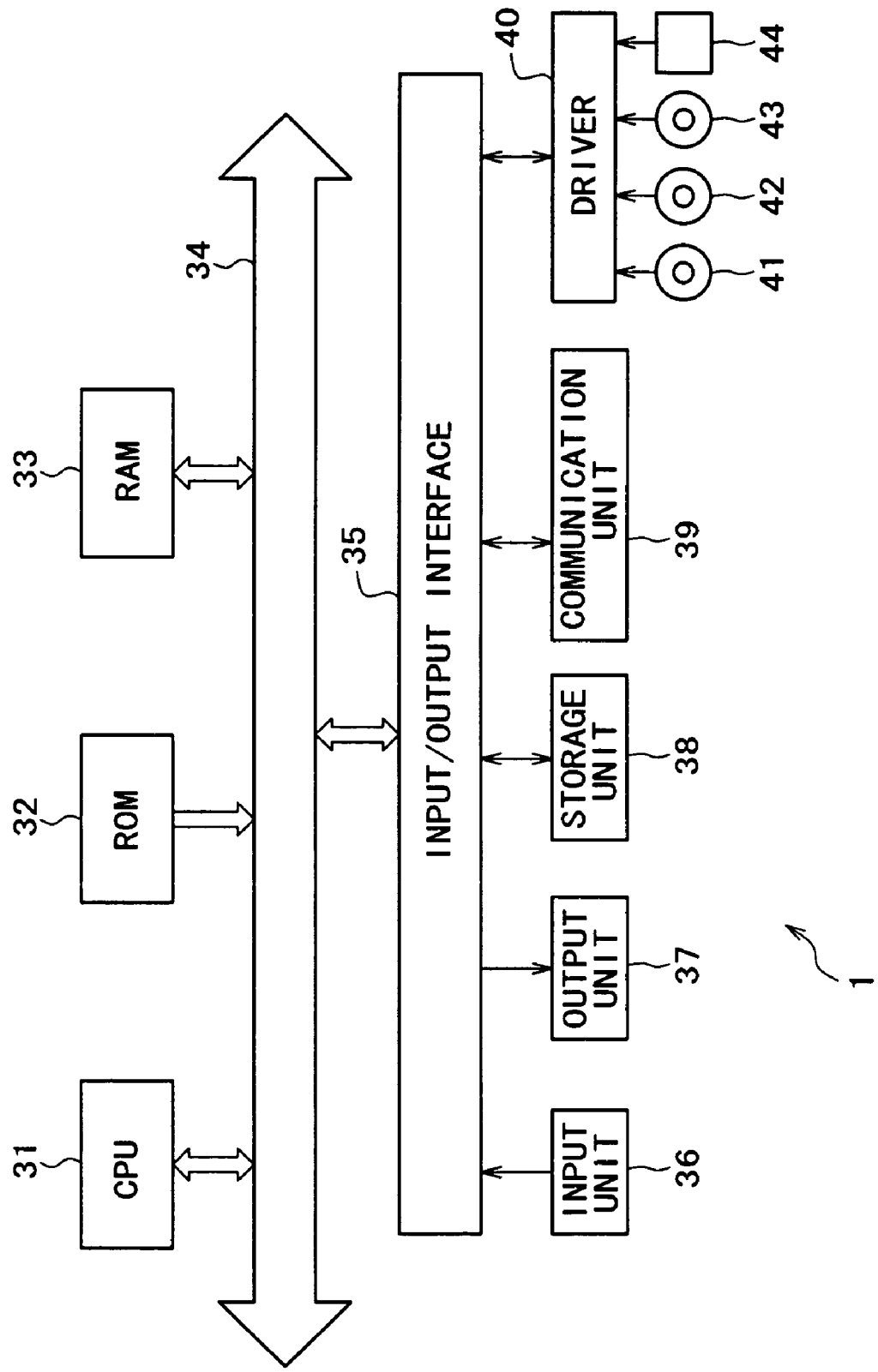
FIG. 2 is a block diagram showing a typical configuration of a user terminal employed in the content-providing system shown in FIG. 1.

FIG. 2 is a diagram showing a typical configuration of hardware employed in the user terminal 1. In an embodiment shown in FIG. 2, the configuration of the user terminal 1 is typically based on a computer.

A CPU (Central Processing Unit) 31 carries out various kinds of processing by execution of programs stored in advance in a ROM (Read Only Memory) 32 and programs loaded from a storage unit 38 to a RAM (Random Access Memory) 33. The RAM 33 is also used for storing, among other information, data required by the CPU 31 in executing the various kinds of processing.

The CPU 31, the ROM 32 and the RAM 33 are connected to each other by a bus 34. The bus 34 is also connected to an input/output interface 35.

The input/output interface 35 is connected to an input unit 36, an output unit 37, the storage unit 38 and a communication unit 39. The input unit 36 comprises a keyboard and a mouse. The output unit 37 comprises a display unit and a speaker. Examples of the display unit are a CRT (Cathode Ray Tube) and an LCD (Liquid Crystal Display). The storage unit 38 typically includes a hard disk. Used for carrying out communications through the network 2, the communication unit 39 comprises a modem and a terminal adapter.

If necessary, a driver 40 is also connected to the input/output interface 35. On the driver 40, a magnetic disk 41, an optical disk 42, a magneto-optical disk 43 or a semiconductor memory 44 is mounted appropriately. If necessary, a computer program is read out from the magnetic disk 41, the optical disk 42, the magneto-optical disk 43 or the semiconductor memory 44, and installed in the storage unit 38.

It is to be noted that the content server 3 and the metadata server 4 can each be designed into a configuration basically identical with the configuration shown in FIG. 2 as the configuration of the user terminal 1. However, the configurations of the content server 3 and the metadata server 4 are not shown in any figures. For this reason, the configurations of the content server 3, the metadata server 4 and other apparatus are explained below by referring to FIG. 2.

The CPU 31 executes a variety of programs to make the computer shown in FIG. 2 function as the user terminal 1, the content server 3 or the metadata server 4. In this case, the programs can be stored in a recording medium embedded in the computer shown in FIG. 2 in advance. The recording medium is either the ROM 32 or the storage unit 38. As an alternative, the programs can be presented to the user as the so-called package software, which is recorded temporarily or permanently in a removable recording medium such as the magnetic disk 41, the optical disk 42, the magneto-optical disk 43 or the semiconductor memory 44.

It is to be noted that the programs can be installed from either a removable recording medium as described above or from a download site. A program installed from a download site is transferred from the site to the computer shown in FIG. 2 by radio communication by way an artificial satellite for digital satellite broadcasting or by wire communication through a LAN (Local Area Network) or the network 2.

FIG. 3 is a block diagram showing a typical functional configuration of the user terminal 1. The functional block shown in FIG. 3 is implemented by execution of a predetermined control program in the CPU 31 employed in the user terminal 1.

A reception unit 101 receives a content 11 or a content license 12 from the content server 3 and metadata 21 or a metadata license 22 from the metadata server 4 through the network 2 and supplies the metadata 21 to a metadata-processing unit 103, the content 11 to a content-processing unit 104 and the content license 12 as well as the metadata license 22 to a DRM (Digital Rights Management) control unit 102.

The DRM control unit 102 comprising a metadata utilization condition determination unit 111 and a content utilization condition determination unit 112 is used to carry out processing to protect the copyrights of a content 11 and metadata 21. Receiving a metadata license 22 from the reception unit 101, the metadata utilization condition determination unit 111 controls the metadata-processing unit 103 in accordance with a metadata utilization condition of the metadata license 22 to carry out predetermined processing on the metadata 21. That is to say, on the basis of the metadata utilization condition, the metadata utilization condition determination unit 111 determines whether or not the user terminal 1 is allowed to process the metadata 21, that is, whether or not the user terminal 1 is allowed to carry out content search processing by using the metadata 21. If a result of determination indicates that the user terminal 1 is allowed to process the metadata 21, the metadata utilization condition determination unit 111 controls the metadata-processing unit 103 to decrypt the metadata 21 and store the decrypted metadata 21 in a metadata DB (database) 212 to be described later by referring to FIG. 4. In addition, receiving an operation signal of a content search operation from the user through the input unit 36, the metadata utilization condition determination unit 111 drives the metadata-processing unit 103 to carry out content search operation by using the metadata 21 stored in the metadata DB 212 in accordance with the metadata utilization condition.

Receiving an operation signal of a content reproduction operation from the user through the input unit 36, the content utilization condition determination unit 112 controls the content-processing unit 104 to carry out predetermined processing on the content 11 on the basis of a content utilization condition of the content license 12 received from the reception unit 101. That is to say, receiving a command making a request for an operation to reproduce the content 11 from the input unit 36, the content utilization condition determination unit 112 determines whether or not the user terminal 1 is allowed to reproduce the content 11 on the basis of the content utilization condition of the of the content license 12 received from the reception unit 101, and if a result of determination indicates that the user terminal 1 is allowed to reproduce the content 11, the content utilization condition determination unit 112 controls the content-processing unit 104 to decrypt the content 11 and reproduce the decrypted content 11. In addition, if the content license 12 for a content 11 to be reproduced as requested by a command entered via the input unit 36 is not available in the user terminal 1, the content utilization condition determination unit 112 controls the content-processing unit 104 to transmit a request for the content license 12 to the content server 3 by way of the transmission unit 105 and the network 2.

The metadata-processing unit 103 carries out predetermined processing on metadata 21 in accordance with control executed by the metadata utilization condition determination unit 111. That is to say, the metadata-processing unit 103 decrypts the metadata 21 received from the reception unit 101, stores metadata 21 in the metadata DB 212 and searches the metadata DB 212 for metadata 21, displaying the metadata 21 as a result of the search processing on a monitor employed in the output unit 37. In addition, the metadata-processing unit 103 transmits a request for metadata 21 or a request for a metadata license 22 to the metadata server 4 by way of the transmission unit 105 and the network 2.

Figure 4:
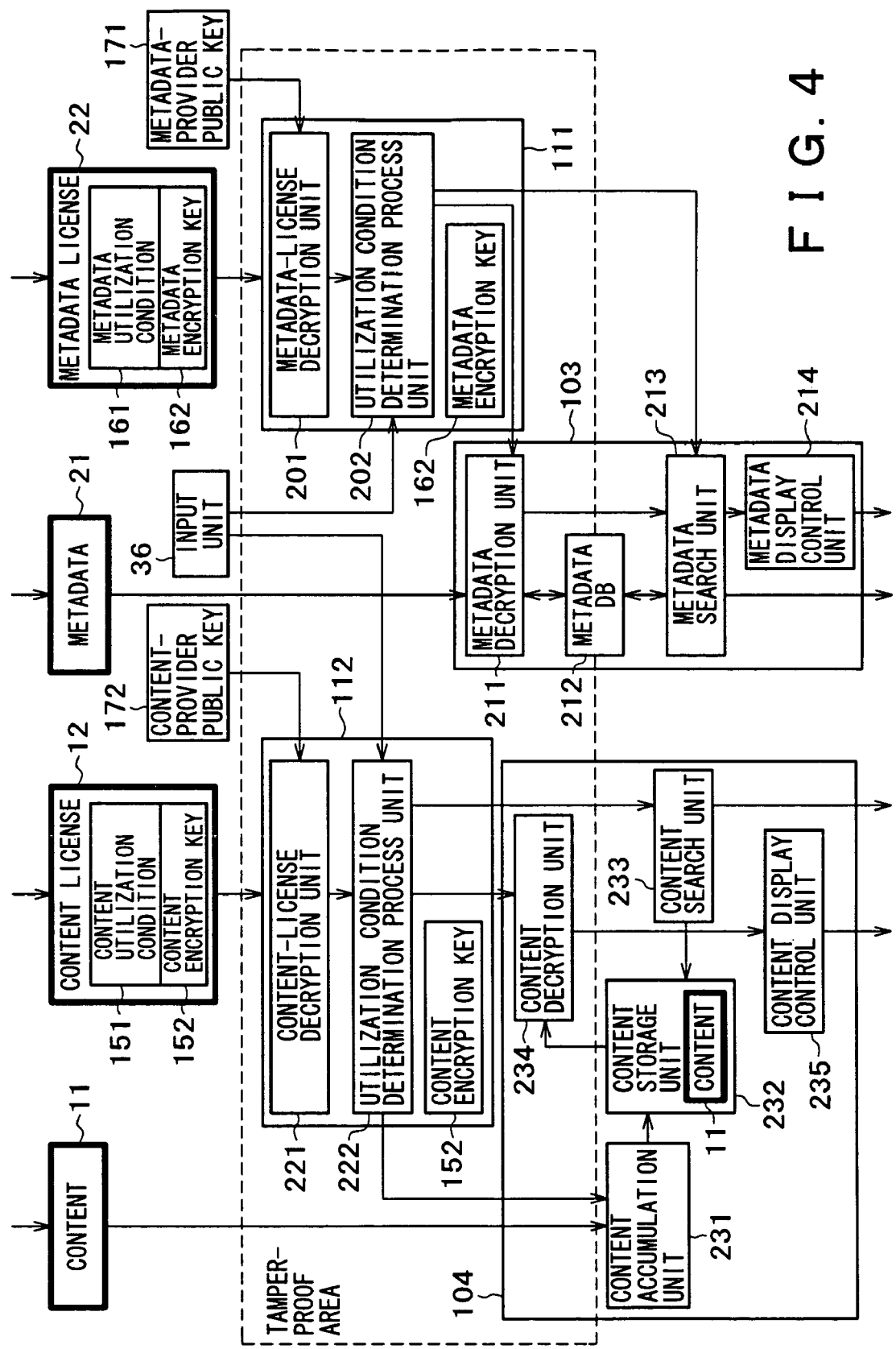
FIG. 4 is a block diagram showing a typical detailed functional configuration of the user terminal shown in FIG. 3.

The content-processing unit 104 transmits a request for a content 11 or a request for a content license 12 to the content server 3 by way of the transmission unit 105 and the network 2 in accordance with control executed by the content utilization condition determination unit 112, stores a content 11 in a content storage unit 232 shown in FIG. 4, decrypts a content 11 and reproduces the decrypted content 11, displaying the decrypted content 11 on a monitor employed in the output unit 37.

The transmission unit 105 receives a request for acquisition of a content from the content-processing unit 104 or a request for acquisition of metadata from the metadata-processing unit 103 and transmits the request to the content server 3 or the metadata server 4 respectively by way of the network 2.

FIG. 4 is a diagram showing a detailed typical functional configuration of the user terminal 1 shown in FIG. 3. That is to say, FIG. 4 is a block diagram showing a detailed typical functional configuration of the metadata-processing unit 103, the content-processing unit 104, the metadata utilization condition determination unit 111 and the content utilization condition determination unit 112, which are shown in FIG. 3. It is to be noted that, in FIG. 4, portions each enclosed in a thick-line frame are pieces of information in an encrypted state.

As shown in the figure, a content 11 is supplied from the content server 3 to the content accumulation unit 231 by way of the network 2 and the reception unit 101. The content 11 has been encrypted in a content provider not shown in the figure by using a content encryption key 152. A content license 12 is supplied from the content server 3 to the content-license decryption unit 221 by way of the network 2 and the reception unit 101. The content license 12 has been encrypted by using a content-provider secret key based on a PKI (Public Key Infrastructure) of the content provider.

The content license 12 comprises a content utilization condition 151 and a content encryption key 152 for decrypting a content 11. The content utilization condition 151 of a content 11 typically includes a content ID (content identifier) of the content 11, a user owning the right to use the content 11 and a condition for exercising the right to use the content 11. An example of the content ID is a URL (Uniform Resource Locator). The condition for exercising the right to use the content 11 typically includes operations that a user owning the right to use the content 11 is allowed to carry out, the time limit of an operation and the number of times the user is allowed to carry out the operation. By a user owning the right to use a content 11, a user granted such a right or a group of such users is meant.

Metadata 21 is supplied from the metadata server 4 to the metadata decryption unit 211 by way of the network 2 and the reception unit 101. The metadata 21 has been encrypted in a metadata provider not shown in the figure by using a metadata encryption key 162. A metadata license 22 is supplied from the metadata server 4 to the metadata-license decryption unit 201 by way of the network 2 and the reception unit 101. The metadata license 22 has been encrypted by using a metadata-provider secret key based on a PKI (Public Key Infrastructure) of the metadata provider.

The metadata 21 for a content 11 comprises information relevant to the content 11. The metadata license 22 comprises a metadata utilization condition 161 and a metadata encryption key 162 for decrypting metadata 21. As shown in FIG. 5, the metadata utilization condition 161 typically includes a metadata ID (a metadata identifier), a user owning the right to use a content 11 (the name of a user granted such a right or the name of a class of such users), elements of operations (element names) and a condition for exercising the right to use the content 11.

In the embodiment shown in FIG. 5, a metadata ID of metadata 21 is an identifier for identifying the metadata 21. An example of the metadata ID is a URL. By a user owning the right to use a content 11, a user granted such a right is meant. The user owning the right to use a content 11 can be represented by the name of the user or the name of a class to which the user pertains. To put it concretely, the user owning the right to use a content 11 is the device name of the user terminal 1 and/or a contract class name, which is defined as the name of a class making a contract with a metadata provider in advance. An element of an operation is a portion (or an element) composing metadata 21 as a portion that can be utilized. The condition for exercising the right to use a content 11 typically includes a device security class and an operation class.

The device security class represents a security level (such as level X) of a device allowed to exercise the right to use a content 11. The security level of a device (such as a user terminal 1) defines the level of security at which processing can be carried out on data requiring protection of a copyright.

In an embodiment shown in FIG. 6, for example, the security level defines whether or not a security policy is to be applied to a configuration element of the metadata DB 212 for storing metadata 21. Examples of the configuration element of the metadata DB 212 are a memory and a hard disk. In this case, if the configuration element of the metadata DB 212 is lower than the security level of the metadata utilization condition 161, the metadata provider is capable of restricting devices allowed to process metadata 21 on the basis of whether or not the configuration element of the metadata DB 212 is included in a tamper-proof area (or a secure area), that is, whether or not metadata 21 is processed in a tamper-proof area, so that the user terminal 1 is not capable of utilizing the metadata 21. That is to say, a metadata provider prevents a device having a low level of security from processing metadata 21.

The operation class indicates allowed operations to be carried out on metadata 21. Examples of the operations are operations to store metadata 21 in a disk, utilize stored metadata 21 and search for metadata 21. It is to be noted that the operation class may include a time limit and the number or times an operation can be carried out.

Refer back to FIG. 4. An area enclosed by a dotted line represents a tamper-proof area in the user terminal 1. As shown in the figure, the metadata utilization condition determination unit 111, the content utilization condition determination unit 112, the metadata decryption unit 211 of the metadata-processing unit 103, a portion of the metadata DB 212 in the metadata-processing unit 103 and the content decryption unit 234 of the content-processing unit 104 are included in the tamper-proof area.

The metadata utilization condition determination unit 111 comprises a metadata-license decryption unit 201 and a utilization condition determination process unit 202. The metadata-license decryption unit 201 acquires a metadata-provider public key 171 based on the PKI of a metadata provider in advance from a CA (Certification Authority) not shown in the figure and keeps the metadata-provider public key 171. The metadata-license decryption unit 201 decrypts a metadata license 22 received from the reception unit 101 by using the metadata-provider public key 171 and divides the encrypted metadata license 22 into a metadata utilization condition 161 and a metadata encryption key 162, which are then supplied to the utilization condition determination process unit 202.

The utilization condition determination process unit 202 determines whether or not the user terminal 1 is a user terminal 1 corresponding to the metadata utilization condition 161 received from the metadata-license decryption unit 201. In dependence on a result of the determination, the utilization condition determination process unit 202 may supply the metadata encryption key 162 to the metadata decryption unit 211 and control the metadata decryption unit 211 to carry out a process to store metadata in accordance with the metadata utilization condition 161. In addition, receiving an operation signal making a request for an operation to search for data associated with a content 11 from the user through the input unit 36, the utilization condition determination process unit 202 controls the metadata search unit 213 in accordance with the metadata utilization condition 161 stored in the metadata DB 212 as the metadata utilization condition 161 of metadata 21 to search for metadata 21 associated with the content 11 by using the metadata utilization condition 161 stored in the metadata DB 212.

The metadata-processing unit 103 comprises a metadata decryption unit 211, a metadata DB 212, the metadata search unit 213 and a metadata display control unit 214. The metadata decryption unit 211 receives encrypted metadata 21 from the reception unit 101 and a metadata encryption key 162 from the utilization condition determination process unit 202. The metadata decryption unit 211 decrypts the metadata 21 by using the metadata encryption key 162 in accordance with control executed by the utilization condition determination process unit 202 and stores the decrypted metadata 21 in the tamper-proof area of the metadata DB 212, or re-encrypts the metadata 21 and stores the re-encrypted metadata 21 in an ordinary area of the metadata DB 212. By an ordinary area, an area other than the tamper-proof area is implied. In addition, if the metadata 21 stored in the ordinary area is identified by the metadata search unit 213, the metadata decryption unit 211 decrypts the identified metadata 21 and stores the decrypted metadata 21 in the tamper-proof area and supplies the decrypted metadata 21 to the metadata search unit 213.

The metadata DB 212 comprises a tamper-proof area and an ordinary area. Examples of the tamper-proof area are a secure memory and a secure hard disk. As will be described later by referring to FIG. 6, for example, security levels are defined for each of the configuration elements. Metadata 21 is developed or stored by the metadata decryption unit 211.

In accordance with control executed by the utilization condition determination process unit 202, the metadata search unit 213 carries out a process to search for a data element of metadata 21 associated with a content 21 specified by the user by using metadata 21 stored in the metadata DB 212. Then, the metadata search unit 213 acquires the metadata 21 for the content 21 specified by the user and generates information on a result of the process to search for the metadata 21 associated with content 21 in accordance with the acquired metadata 21. Subsequently, the metadata search unit 213 supplies the generated information on a result of the process to search for the metadata 21 associated with content 21 to the metadata display control unit 214. In addition, also in accordance with control executed by the utilization condition determination process unit 202, the metadata search unit 213 transmits a request to the metadata server 4 through the transmission unit 105 and the network 2 as a request to acquire desired metadata 21 and a desired metadata license 22 from the metadata server 4.

The metadata display control unit 214 executes control to output a picture to typically a monitor composing the output unit 37. The picture is based on the information received from the metadata search unit 213 as information on a result of the process carried out in the metadata search unit 213 to search for a data element of metadata 21 associated with content 11 by using the metadata 21.

The content utilization condition determination unit 112 comprises a content-license decryption unit 221 and a utilization condition determination process unit 222. The content-license decryption unit 221 acquires a content-provider public key 172 based on the PKI of a content provider in advance from a CA not shown in the figure and stores the acquired content-provider public key 172. By using the content-provider public key 172, the content-license decryption unit 201 decrypts a content license 12 received from the reception unit 101 and splits the decrypted content license 12 into a content utilization condition 151 and a content encryption key 152 before supplying the content utilization condition 151 and the content encryption key 152 to the utilization condition determination process unit 222.

On the basis of an operation signal received from the input unit 36 as a signal representing an operation carried out by the user, the utilization condition determination process unit 222 determines whether or not the user terminal 1 is a user terminal 1 corresponding to the content utilization condition 151 received from the content-license decryption unit 221. In dependence on a result of the determination, the utilization condition determination process unit 222 may supply the content encryption key 152 to a content decryption unit 234 and control a content accumulation unit 231, a content search unit 233 and the content decryption unit 234 to carry out processing based on the content utilization condition 151. That is to say, receiving a request for an operation to reproduce a content 11 from the input unit 36, the utilization condition determination process unit 222 determines whether or not the user terminal 1 is a terminal allowed to reproduce the content 11 on the basis of the content utilization condition 151. If a result of the determination indicates that the user terminal 1 is a terminal allowed to reproduce the content 11, the utilization condition determination process unit 222 supplies the content encryption key 152 to the content decryption unit 234 and controls the content search unit 233 as well as the content decryption unit 234 to decrypt the content 11 and reproduce the decrypted content 11.

The content-processing unit 104 comprises the content accumulation unit 231, a content storage unit 232, the content search unit 233, the content decryption unit 234 and a content display control unit 235. The content accumulation unit 231 receives an encrypted content 11 from the reception unit 101. In accordance with control executed by the utilization condition determination process unit 222, the content accumulation unit 231 stores the received content 11 in the content storage unit 232.

The content storage unit 232 comprises a memory and a hard disk for temporarily saving and storing an encrypted content 11. In accordance with control executed by the utilization condition determination process unit 222, the content search unit 233 searches the content storage unit 232 for a content 11 identified by a content ID as a content 11 to be reproduced and requests the content decryption unit 234 to decrypt the content 11 found in the search operation. If the content 11 identified by a content ID as a content 11 to be reproduced does not exist in the content storage unit 232, the metadata search unit 213 controls the transmission unit 105 to transmit a request for the desired content 11 to the content server 3 by way of the network 2.

The content decryption unit 234 receives a content 11 obtained as a result of an operation to search the content storage unit 232 from the content search unit 233, and decrypts the content 11 by using the content encryption key 152 in the tamper-proof area. The content decryption unit 234 then supplies the decrypted content 11 to the content display control unit 235. The content display control unit 235 outputs a picture based on the content 11 received from the content decryption unit 234 to typically a monitor composing the output unit 37.

FIG. 6 is a diagram showing relations between configuration elements of the metadata DB 212 and security levels. In the user terminal 1, a security level of a user terminal 1 is defined in accordance with the degree of security for configuration elements composing the metadata DB 212 employed in the user terminal 1.

Security level 1 is defined as the security level of a user terminal 1 in which a tamper-proof memory serving as a secure memory is used as the configuration element of the metadata DB 212. Security level 2 is defined as the security level of a user terminal 1 in which a secure memory and a tamper-proof secure hard disk are used as configuration elements of the metadata DB 212. Security level 3 is defined as the security level of a user terminal 1 in which a secure memory and an ordinary hard disk serving as a non-tamper-proof hard disk are used as configuration elements of the metadata DB 212. Security level 4 is defined as the security level of a user terminal 1 in which an ordinary memory serving as a non-tamper-proof memory and an ordinary hard disk serving as a non-tamper-proof hard disk are used as configuration elements of the metadata DB 212.

In the embodiment shown in FIG. 6, a security level of the user terminal 1 is defined in accordance with the degree of security for configuration elements composing the metadata DB 212 employed in the user terminal 1. It is to be noted, however, that in place of the degree of security for configuration elements composing the metadata DB 212, a security level of the user terminal 1 can also be defined in accordance with the degree of security for the metadata search unit 213, which carries out an operation to search for metadata and outputs a result of the search operation in response to a request for the operation. As another alternative, a security level of the user terminal 1 can also be defined in accordance with the degree of security for the metadata display control unit 214, which receives the result of the search operation carried out by the metadata search unit 213. That is to say, a security level of the user terminal 1 can also be defined in dependence on whether or not the metadata search unit 213 or the metadata display control unit 214 is capable of carrying out its processing in a tamper-proof area.

Figure 7:
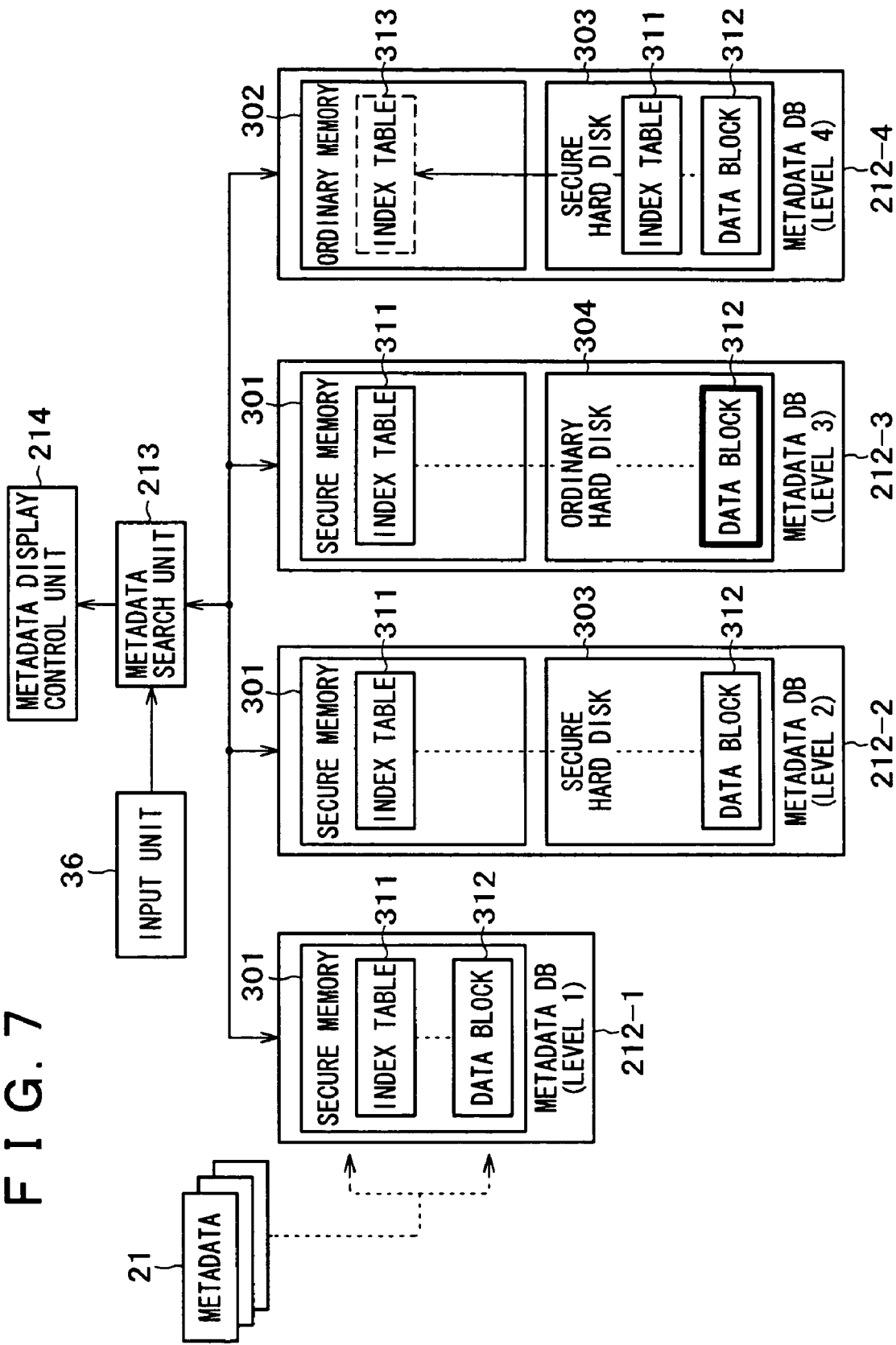
FIG. 7 is a block diagram showing a typical configuration of the metadata DB comprising configuration blocks for the security levels shown in FIG. 6.

By referring to FIG. 7, the following description explains processing of metadata 21 stored in the metadata DB 212 set at the security levels shown in FIG. 6. An embodiment shown in FIG. 7 implements a typical configuration of the metadata DB 212 as a configuration comprising a metadata DB 212-1 set at security level 1, a metadata DB 212-2 set at security level 2, a metadata DB 212-3 set at security level 3 and a metadata DB 212-4 set at security level 4. It is to be noted that, in a user terminal 1, the metadata DB 212 may have a configuration including elements set at all these security levels or a configuration including only an element set at one of the security levels in accordance with the functional configuration element of the user terminal 1.

In the case of the embodiment shown in FIG. 7, the user terminal 1 includes a secure memory 301, an ordinary memory 302, a secure hard disk 303 and an ordinary hard disk 304. It is to be noted that, in each of the memories and each of the hard disks, an index table and a data block, which are enclosed by a solid line, are a resident index table and a resident data block respectively. An index table and a data block, which are enclosed by a dotted line, are developed from time to time. An index table and a data block, which are enclosed by a thick line, are a normally encrypted index table and a normally encrypted data block respectively.

The metadata DB 212-1 is set at security level 1 and implemented as a secure memory 301. In the configuration of the metadata DB 212-1, assume for example that a right-exercising condition included in the metadata utilization condition 161 for metadata 21 states that a search operation can be carried out at security level 1. The right-exercising condition is a condition for exercising the right to use the metadata 21. In this case, in accordance with control executed by the utilization condition determination process unit 202, the metadata decryption unit 211 divides the metadata 21 into an index table 311 and a data block 312. The index table 311 and the data block 312 are then stored in the secure memory 301. The index table 311 is a table of indexes allowing data elements of the metadata 21 to be searched with a high degree of efficiency and the data block 312 is a block comprising the data elements of the metadata 21.

The metadata DB 212-2 is set at security level 2 and implemented as a secure memory 301 and a secure hard disk 303. In the configuration of the metadata DB 212-2, assume for example that the right-exercising condition included in the metadata utilization condition 161 for metadata 21 states that a search operation can be carried out at security level 2. In this case, in accordance with control executed by the utilization condition determination process unit 202, the metadata decryption unit 211 divides the metadata 21 into an index table 311 and a data block 312, which are then stored in the secure memory 301 and the secure hard disk 303 respectively.

The metadata DB 212-3 is set at security level 3 and implemented as a secure memory 301 and an ordinary hard disk 304. In the configuration of the metadata DB 212-3, assume for example that the right-exercising condition included in the metadata utilization condition 161 for metadata 21 states that a search operation can be carried out at security level 3. In this case, in accordance with control executed by the utilization condition determination process unit 202, the metadata decryption unit 211 divides the metadata 21 into an index table 311 and a data block 312. The index table 311 is stored in the secure memory 301 whereas the data block 312 is encrypted and stored in the ordinary hard disk 304.

The metadata DB 212-4 is set at security level 4 and implemented as an ordinary memory 302 and a secure hard disk 303. In the configuration of the metadata DB 212-4, assume for example that the right-exercising condition included in the metadata utilization condition 161 for metadata 21 states that a search operation can be carried out at security level 4. In this case, in accordance with control executed by the utilization condition determination process unit 202, the metadata decryption unit 211 divides the metadata 21 into an index table 311 and a data block 312, which are then both stored the secure hard disk 303.

It is to be noted that, with the user terminal 1 including a metadata DB 212-1 set at security level 1, an expensive secure memory 301 is necessary because the secure memory 301 is required to have a large capacity for storing the index table 311 and the data block 312 as resident data. Since the index table 311 and the data block 312 are both stored in the secure memory 301, however, the safety of the metadata 21 is enhanced and the search speed is increased.

With the user terminal 1 including a metadata DB 212-2 set at security level 2, the index table 311 and the data block 312 are stored in the secure memory 301 and the secure hard disk 303 respectively. In consequence, the safety of the metadata 21 and the search speed deteriorate in comparison with security level 1. Since the secure memory 301 is used for storing only the index table 311 as resident data and a secure hard disk 303 cheaper than the secure memory 301 is used for storing the data block 312, however, the metadata DB 212-2 can be implemented at a cost lower than the metadata DB 212-1 set at security level 1.

With the user terminal 1 including a metadata DB 212-3 set at security level 3, the index table 311 is stored in the secure memory 301 and the data block 312 is encrypted and stored in the ordinary hard disk 304. In consequence, in operations to supply and read out a data element to and from the ordinary hard disk 304, encryption and decryption processes must be carried out respectively. Thus, the search speed deteriorates. Since the secure hard disk 303 is not required, however, the metadata DB 212-3 can be implemented at a cost reduced by an amount corresponding to the replacement of the secure hard disk 303 with the ordinary hard disk 304.

With the user terminal 1 including a metadata DB 212-4 set at security level 4, the index table 311 and the data block 312 are both stored in the secure hard disk 303. In consequence, every time metadata 21 is searched for, it is necessary to transfer the index table 311 from the secure hard disk 303 to the ordinary memory 302. As a result, the search speed and the safety cannot be said to be high. Since the expensive secure memory 301 is not required, however, the metadata DB 212-4 can be implemented at a cost reduced by an amount corresponding to the replacement of the secure memory 301 with the ordinary memory 302.

As described above, the right-exercising condition included in the metadata utilization condition 161 for metadata 21 states the security level of the metadata DB 212 employed in the user terminal 1 so that user terminals 1 allowed to utilize the metadata 21 and methods adoptable by an allowed user terminal 1 to process the metadata 21 can be restricted. The methods adoptable by an allowed user terminal 1 to process the metadata 21 are areas in which the metadata 21 is processed by the user terminal 1. The following description explains content search processing carried out to search for a data element by using metadata 21 stored in the metadata DBs 212-1 to 212-4 having configurations and security levels as described above.

In the case of processing to search for a data element of metadata 21 stored in the metadata DB 212-1, when the metadata search unit 213 receives a request for an operation to search for a data element for a content 11 specified by the user from the utilization condition determination process unit 202, in accordance with control based on a security level of the metadata utilization condition 161 of the utilization condition determination process unit 202, the metadata search unit 213 uses the index table 311 stored in the secure memory 301 to search for metadata 21 associated with the specified content 11 and identifies a data element corresponding to the metadata 21 found in the search operation from the data block 312 stored in the secure memory 301. Then, on the basis of the identified data element, the metadata search unit 213 produces a result of the operation to search for the data element for a content 11 specified by the user and supplies the result of the content search operation to the metadata display control unit 214.

In the case of processing to search for a data element of metadata 21 stored in the metadata DB 212-2, when the metadata search unit 213 receives a request for an operation to search for a data element for a content 11 specified by the user from the utilization condition determination process unit 202, in accordance with control based on a security level of the metadata utilization condition 161 of the utilization condition determination process unit 202, the metadata search unit 213 uses the index table 311 stored in the secure memory 301 to search for metadata 21 associated with the specified content 11 and identifies a data element corresponding to the metadata 21 found in the search operation from the data block 312 stored in the secure hard disk 303. Then, on the basis of the identified data element, the metadata search unit 213 produces a result of the operation to search for the data element for a content 11 specified by the user and supplies the result of the content search operation to the metadata display control unit 214.

In the case of processing to search for a data element of metadata 21 stored in the metadata DB 212-3, when the metadata search unit 213 receives a request for an operation to search for a data element for a content 11 specified by the user from the utilization condition determination process unit 202, in accordance with control based on a security level of the metadata utilization condition 161 of the utilization condition determination process unit 202, the metadata search unit 213 uses the index table 311 stored in the secure memory 301 to search for metadata 21 associated with the specified content 11 and identifies a data element corresponding to the metadata 21 found in the search operation from the data block 312 stored in the ordinary hard disk 304. Then, the metadata search unit 213 requests the metadata decryption unit 211 to decrypt the identified data element, and on the basis of the decrypted data element, the metadata search unit 213 produces a result of the operation to search for the data element for a content 11 specified by the user and supplies the result of the content search operation to the metadata display control unit 214.

In the case of processing to search for a data element of metadata 21 stored in the metadata DB 212-4, when the metadata search unit 213 receives a request for an operation to search for a data element for a content 11 specified by the user from the utilization condition determination process unit 202, in accordance with control based on a security level of the metadata utilization condition 161 of the utilization condition determination process unit 202, the metadata search unit 213 develops the index table 311 stored in the secure hard disk 303 into an index table 313 stored in the ordinary memory 302 and uses the developed index table 313 to search for metadata 21 associated with the specified content 11. Subsequently, the metadata search unit 213 identifies a data block corresponding to the metadata 21 found in the search operation from the data block 312 stored in the secure hard disk 303. Then, on the basis of the identified data element, the metadata search unit 213 produces a result of the operation to search for the data element for a content 11 specified by the user and supplies the result of the content search operation to the metadata display control unit 214. Finally, after finding the data element for the specified content 11 by using the metadata 21, the metadata search unit 213 deletes the developed index table 313 from the ordinary memory 302.

As described above, the metadata search unit 213 carries out a search operation in accordance with the security level of the metadata utilization condition 161. That is to say, by describing the security level in the metadata utilization condition 161, processing carried out in the user terminal 1 can be controlled in accordance with the importance of the substance of metadata 21. To be more specific, it is possible to control processing of the user terminal 1 having no necessary function such as the secure memory 301.

FIG. 8 is a diagram showing a typical data structure of the content utilization condition 151. It is to be noted that, in the data structure shown in FIG. 8, a number and a colon are provided on each line as additional information only to make the explanation easy to present. The number and the colon are not a part of the code. The marks " . . . " on the first line and the last line respectively indicate that other codes exist before the first line and after the last line. Numbers, colons and the marks " . . . " shown in FIGS. 9 to 11 are added for the same purposes as those shown in FIG. 8. The content utilization condition 151 implemented by the embodiment shown in FIG. 8 is also described as an XrML (extensible Rights Markup Language) at http://www.xrml.org/.

<?xml version="1.0" encoding="UTF-8"?> on the 1st line indicates that the content utilization condition 151 described on the second and subsequent lines is described in version 1.0 of an XML format and encoded in accordance with UTF-8. In the embodiment shown in FIG. 8, descriptions from <license xmlns="urn:abc:contentsLicense" xmlns:xsi=http://www.w3.org/2001/XMLScema-instance xsi:schemaLocation="urn:abc:contentsLicense http://www.abc.com/contentsLicense.xsd"> on the 2nd to 5th lines to </license> on the 34th line describe the content utilization condition 151 in the XML format. This license <license> serves as a base of an XrML access control expression format and expresses rules in terms of a main subject (a user granted a right to use a content) <user>, a resource (the content to be used) <digitalResource>, conditions <allConditions> and an operation <Action>, which are explained below.

<inventory> <digitalResource licensePartId="targerContent"> <nonSecureIndirect URI="urn:xyz:contents1"> </digitalResource> </inventory> on the 6th to 10th lines indicates that the target resource (content) is a content identified by a content ID URI="urn:xyz:contents1".

A range of rights for a content is described between <grantGroup> on the 11th line and </grantGroup> on the 33rd line. <user deviceID="stb1.abc.co.jp"/> on the 12th line indicates that the main subject (a user granted a right to use a content) <user> is a user identified by a device ID "stb1.abc.co.jp" (indicating a set top box or the like). The substance of a right which this user is allowed to exercise is described in <grant> on the 13th line to </grant> on the 22nd line and <grant> on the 23rd line to </grant> on the 32nd line.

Between <grant> on the 13th line and </grant> on the 22nd line, <play/> on the 14th line indicates that that an operation <Action> is a reproduction "play". <digitalResource licensePartIdRef="targetContent"/> on the 15th line indicates that the target resource <digitalResource> is a content ID described in "targetcontent" on the 8th line. <allConditions> <validityinternal> <notBefore> 2003-11-15T04:03:02 </notBefore> <notAfter> 2003-12-06T04:03:02 </notAfter> </validityInterval> </allConditions> on the 16th to 21st lines indicates that, as conditions <allConditions>, a validity period "validityInterval" is a period from "2003-11-15T04:03:02" representing a time of 04:03:02 on Nov. 15, 2003 to "2003-12-06T04:03:02" representing a time of 04:03:02 on Dec. 6, 2003.

Between <grant> on the 23rd line and </grant> on the 32nd line, <copy/> on the 24th line indicates that that an operation <Action> is a "copy". <digitalResource licensePartIdRef="targetContent"/> on the 25th line indicates that a target resource <digitalResource> is a content ID described in "targetcontent" on the 8th line. <allConditions> <count> 1</count> <recordingMedia> <memoryStick/> </recordingMedia> </allConditions> on the 26th to the 31st lines indicates that, as conditions <allConditions>, recording media "recordingMedia" is a memory stick (a trademark) "memoryStick" and a recording-operation count "count" is 1.

That is to say, the content utilization condition 151 shown in FIG. 8 indicates that a user terminal 1 such as a set top box identified by a device ID "stb1.abc.co.jp" is allowed to reproduce (or "play") a content identified by a content ID "URI="urn:xyz:contents1"" during a validity period from a time of 04:03:02 on Nov. 15, 2003 to a time of 04:03:02 on Dec. 6, 2003 and copy the content to recording media "memoryStick" once.

By referring to FIGS. 9 to 11, the next description explains a typical metadata utilization condition 161 described by an XACML (extensible Access Control Language) at http://www.oasis-open.org/committees/tc_home.php?wg_abbrev=xacml.

<?xml version="1.0" encoding="UTF-8" ?> on the 1st line indicates that the metadata utilization condition 161 described on the second and subsequent lines is described in version 1.0 of an XML format and encoded in accordance with UTF-8. In the embodiment shown in FIG. 9, descriptions from <Policy xmlns="urn:oasis:names:tc:xacml:1.0:policy" xmlns:xsi=http://www.w3.org/2001/XMLSchema-instance xsi:schemaLocation="urn:oasis:names:tc:xacml:1.0:policy http://www.oasis-open.org/tc/xacml/1.0/cs-xacml-schema-policy-01.xsd" PolicyId="urn.metadataAccessControlPolicy1" RuleCombiningAlgId="urn:oasis:names:tc:xacml:1.0:rule-combining-algorithm:deny-overrides"> on the 2nd to 7th lines to </Policy> on the 62nd line describe rules <rule> of using metadata in the XML format.

<Target> <Subjects> <AnySubject/> </Subjects> <Resources> <AnySubject/> </Resources> <Actions> <AnyAction/> </Actions> </Target> on the 8th to 12th lines indicates that rules (utilization conditions) <Rule> serving as a base of the XrML access control expression format comprise rules for a main subject (a user granted a right to use metadata) <subjects>, a resource (the metadata to be used) <Resources> and an action (operation) <Actions>. The rules are described from <Rule RuleId="urn:metadataAccessControlRule1" Effect="Permit"> on the 13th line to </Rule> on the 61st line.

Rules relevant to a plurality of main subjects can be described from <Subjects> on the 15th line to </Subjects> on the 37th line. In this case, three rules for a main subject can be described between <Subject> on the 16th line to </Subject> on the 36th line.

<SubjectMatch MatchId="urn:oasis:names:tc:xacml:1.0:function:rfc822Name-match"> <SubjectAttributeDesignator AttributeId="urn:oasis:names:tc:xacml:1.0:subject:subject-id" DataType="rfc822Name"/> <;AttributeValue DataType="rfc822Name"> abc.co.jp </AttributeValue> </SubjectMatch> on the 17th to 23rd lines indicates that the main-subject ID (identifier) attribute "subject-id" includes a character string "abc.co.jp". <SubjectMatch MatchId="urn:oasis:names:tc:xacml:1.0:function:string-equal"> <SubjectAttributeDesignator AttributeId="urn:abc:xacml:subject:group" DataType="http://www.w3.org/2001/XMLSchema#string"/> <AttributeValue> subscriberGroup1 </AttributeValue> </SubjectMatch> on the 24th to 29th lines indicates that the group attribute "subject-group" of the main subject is "subscriberGroup1". <SubjectMatch MatchId="urn:oasis:names:tc:xacml:1.0:function:string-equal"> <SubjectAttributeDesignator AttributeId="urn:abc:xacml:subject:deviceSecurityLevel" DataType="http://www.w3.org/2001/XMLSchema#string"/> <AttributeValue> level1 </AttributeValue> </SubjectMatch> on the 30th to 35th lines indicates that the device security level attribute "deviceSecurityLevel" of the main subject is level 1 "level 1".

Between <Resources> on the 38th line and </Resources> on the 49th line, a plurality of target resources (metadata) in the metadata utilization condition 161 can be described. In this case, one resource is described between <Resource> on the 39th line and </Resource> on the 48th line.

That is to say, <ResourceMatch MatchId="urn:oasis:names:tc:xacml:1.0:function:anyURI-equal"> <ResourceAttributeDesignator AttributeId="urn:abc:xacml:resource:resource-uri" DataType="http://www.w3.org/2001/XMLSchema#anyURI"/> <AttributeValue> file://localhost/metadataInstanceRepository/metadataInstance1.xml </AttributeValue> </ResourceMatch> on the 40th to 47th lines indicates the ID (identifier) attribute "resource-uri" of the resource is "file://localhost/metadataInstanceRepository/metadataInstance1.xml".

Between <Actions> on the 50th line and </Actions> on the 59th line, a plurality of operation methods adopted by the main subject to make an access to a resource in the metadata utilization condition 161 can be described. In this case, one operation method is described between <Action> on the 51st line and </Action> on the 58th line.

That is to say, <ActionMatch MatchId="urn:oasis:names:tc:xacml:1.0:function:string-equal"> <ActionAttributeDesignatorAttributeId="urn:abc:xacm1:action" DataType="http://www.w3.org/2001/XMLSchema#string"/> <AttributeValue> read </AttributeValue> </ActionMatch> on the 52nd to 57th lines indicates the operation method "Action" is "read".

That is to say, in the case of a set top box (such as "stb1.abc.co.jp") identified by a device ID (identifier attribute) including "abc.co.jp," a metadata acquisition contract class "subscriberGroup1" and a device security level "level1", the metadata utilization condition 161 shown in FIGS. 9 to 11 represents a rule (a utilization condition) stating that the operation method "read" can be applied to metadata identified by a metadata ID "file://localhost/metadataInstanceRepository/metadataInstance1.xml".

FIGS. 12 to 15 are diagrams each showing a typical data structure of metadata 21. Metadata 21 is general information on a content 11 and is independent of the release and broadcasting format of the content 11. In accordance with the substance of the information described in the metadata 21, the metadata 21 is divided into typically the following categories: program metadata shown in FIG. 12, program-location metadata shown in FIG. 13, segmentation metadata shown in FIG. 14 and program-group metadata shown in FIG. 15.

FIG. 12 is a diagram showing a data structure of metadata 21 pertaining to the category of program metadata. The program metadata is metadata 21 comprising pieces of information on a program, which is a content unit such as a TV program. Program metadata is used for example in an operation to search for a content 11 or an operation to obtain the substance of a content 11.

In the case of the embodiment shown in FIG. 12, the program metadata of a content 11 comprises the title of the content 11, a synopsis of the content 11, a keyword for searching purposes, the genre of the content 11, the parental rating of the content 11, the language of the content 11, the cast list of the content 11, materials related to the content 11, the production year of the content 11, the production country of the content 11 and a review of the content 11. Examples of the genre of the content 11 are dramas and news. The parental rating of the content 11 is a level of restriction limiting accesses to the content 11. The language of the content 11 is the language of voices in the content 11. The cast list of the content 11 is a list of performers appearing in the content 11. The materials related to the content 11 are references describing other information on the content 11. The review of the content 11 is evaluation of the content 11.

FIG. 13 is a diagram showing a data structure of metadata 21 pertaining to the category of program-location metadata. The program-location metadata is metadata 21 required due to differences in content distribution time period, broadcasting channel, content-server address, distribution protocol and distribution format, be the content 11 distributed by way of a network 2 or distributed as a digital broadcasting wave. By the content-server address, the address of a content server 3 serving as content archives is meant.

In the case of the embodiment shown in FIG. 13, the program-location metadata of a content 11 comprises a URL "LocationURL", an encoding format "Format" and start and end times "StartDate/EndDate". The URL is information indicating a location at which the content 11 is registered. The encoding format is the format in which the content 11 is registered. The start and end times are a time period during which the content 11 is distributed or can be acquired. It is to be noted that the program-location metadata of a content 11 may also include other information such as a channel through which the content 11 is distributed, a time at which the content 11 is distributed and information indicating live broadcasting of the content 11.

FIG. 14 is a diagram showing a data structure of metadata 21 pertaining to the category of segment metadata. The segment metadata is a segment group comprising a plurality of collected segments pertaining to different programs. Typically, each of the segments in the group is a highlight scene of a content 11 or a scene showing favorite film stars in a content 11. Such segments are collected to form a digest version of contents 11. The metadata can then be used to compose the original program.

In the case of the embodiment shown in FIG. 14, the segment metadata of a content 11 comprises the title of the content 11, a synopsis of the content 11, a keyword for searching purposes, a key frame showing the location of a required segment in the program and a segment location representing the start and end times of the required segment.

FIG. 15 is a diagram showing a data structure of metadata 21 pertaining to the category of program-group metadata. The program-group metadata is information on a program group comprising a plurality of collected programs. Such a program group is used for, among others, searching a content 11 in series units. It is to be noted that types of program group include a program series such as episodes 1 to N, a show, a program concept such as a director cut and a program compilation. A show is a collection of program series and a program compilation is a result of compiling programs. An example of the show is a collection of all episodes and an example of the program compilation is a result of editing news segments about a war.

In the case of the embodiment shown in FIG. 15, the program-group metadata of a content 11 comprises the title of the content 11, a synopsis of the content 11, a keyword for searching purposes, the genre of the content 11, the parental rating of the content 11, the language of the content 11, the cast list of the content 11, materials related to the content 11, the production year of the content 11, the production country of the content 11, a review of the content 11 and group elements. Examples of the genre of the content 11 are dramas and news. The parental rating of the content 11 is a level of restriction limiting accesses to the content 11. The language of the content 11 is the language of voices in the content 11. The cast list of the content 11 is a list of performers appearing in the content 11. The materials related to the content 11 are relevant contents 11 such as series works. The review of the content 11 is evaluation of the content 11.

Figure 16:
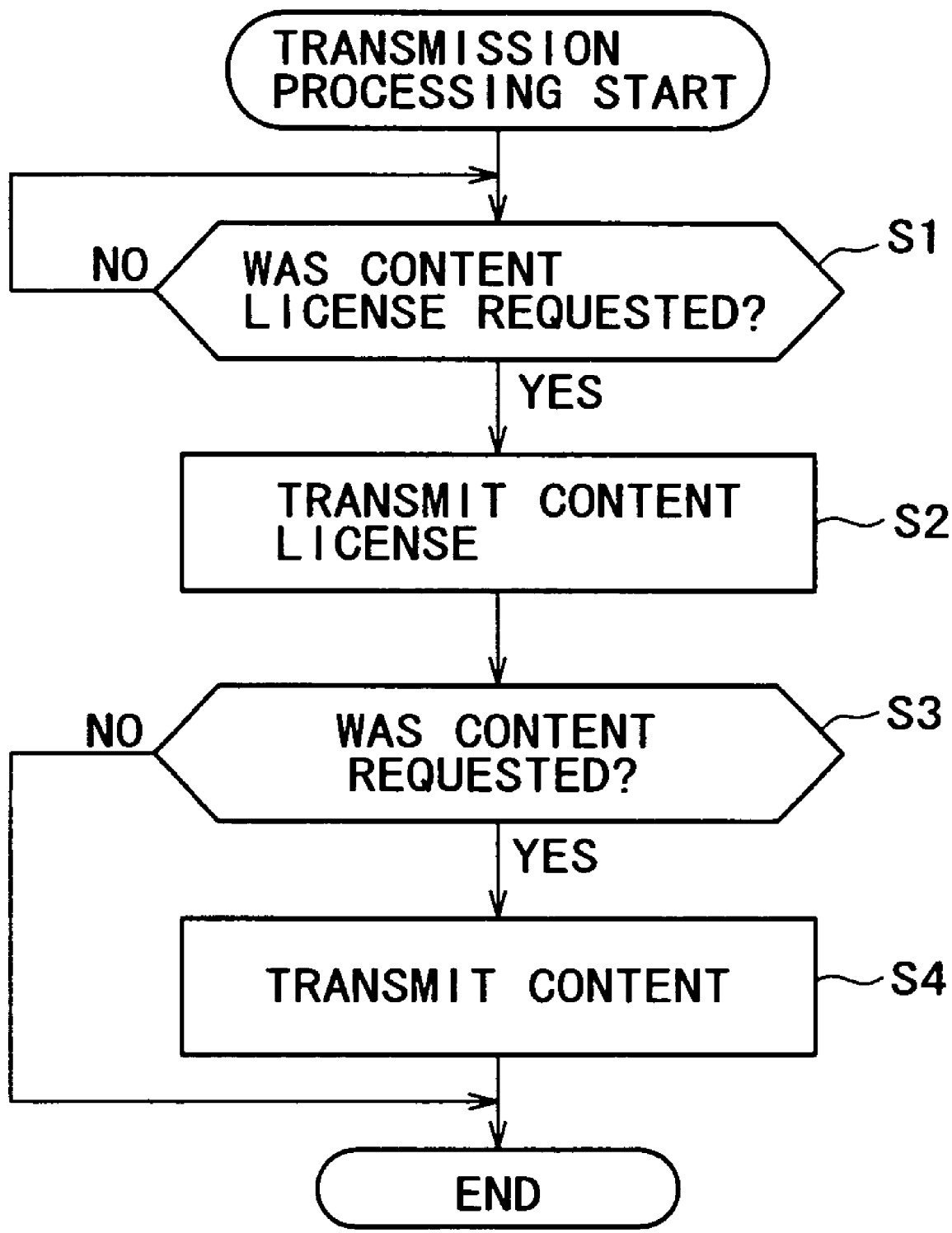
FIG. 16 shows a flowchart referred to in explanation of transmission processing carried out by a content server employed in the content-providing system shown in FIG. 1.

Next, transmission processing carried out by the content server 3 is explained by referring to a flowchart shown in FIG. 16. The transmission processing is carried out for example in response to a request received from a user terminal 1 through the network 2 as a request for a content license 12 of a content 11 at a step S206 of a flowchart to be described later by referring to FIG. 24.

First of all, the communication unit 39 employed in the content server 3 receives a request for a content license 12 and supplies the request to the CPU 31. At a step S1, the CPU 31 determines whether or not a request for a content license 12 has been received, entering a state of waiting for such a request to be made. As the result of the determination indicates that a request for a content license 12 has been received, the flow of the transmission processing goes on to a step S2 at which the CPU 31 reads out the requested content license 12 of a content 11 from the storage unit 38 and controls the communication unit 39 to transmit the content license 12 read out from the storage unit 38 to the user terminal 1 by way of the network 2.

Figure 24:
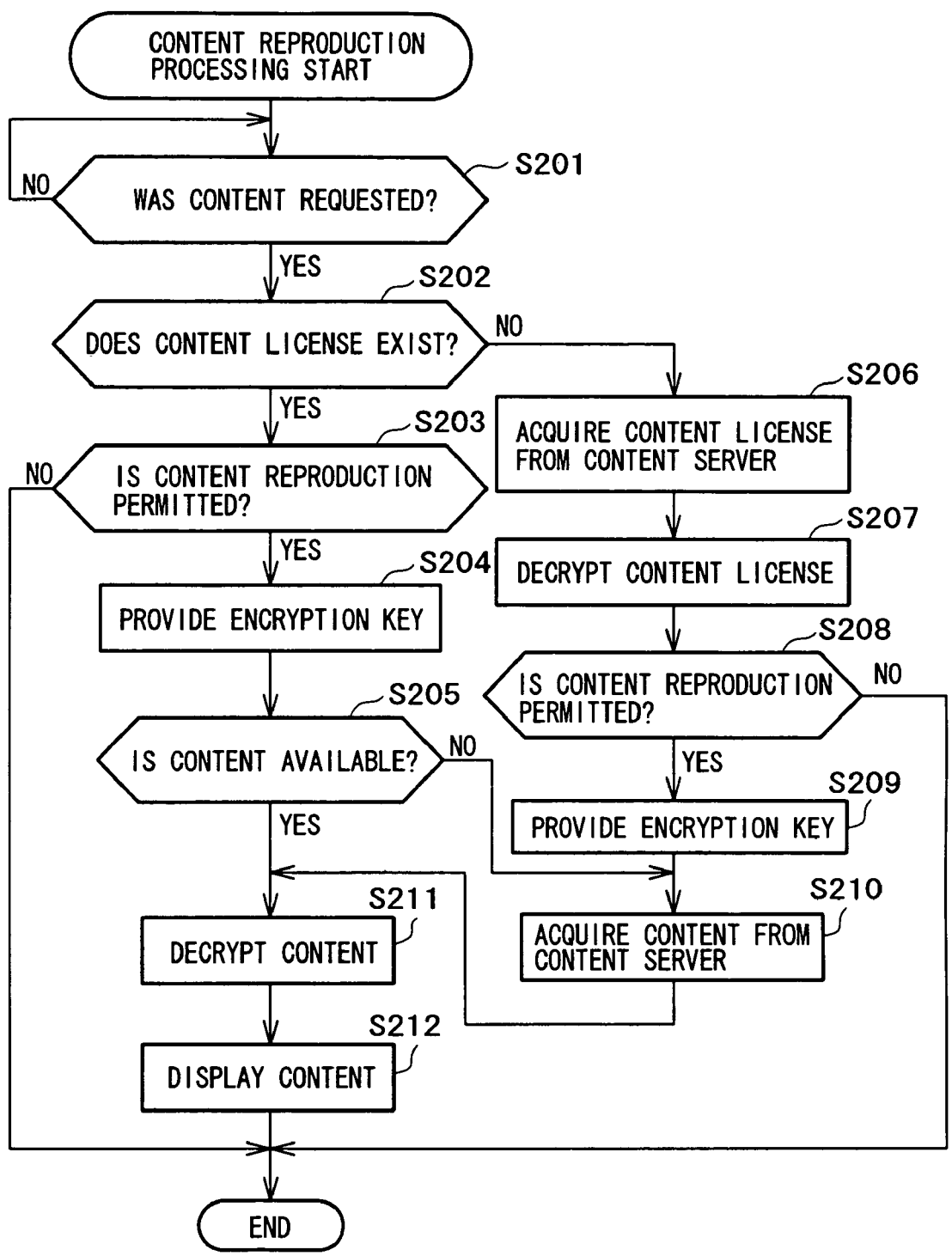
FIG. 24 shows a flowchart referred to in explanation of processing carried out by the user terminal employed in the content-providing system shown in FIG. 1 to reproduce a content.

At a step S210 of the flowchart shown in FIG. 24, on the other hand, a request for a content 11 is transmitted from a user terminal 1. The communication unit 39 employed in the content server 3 receives the request for a content 11 and supplies the request to the CPU 31. At a step S3, the CPU 31 determines whether or not a request for a content 11 has been received. If the result of the determination indicates that a request for a content 11 has been received, the flow of the transmission processing goes on to a step S4 at which the CPU 31 reads out the requested content 11 from the storage unit 38 and controls the communication unit 39 to transmit the content 11 read out from the storage unit 38 to the user terminal 1 by way of the network 2. Then, the execution of the processing to transmit the content license 12 and the content 11 is ended.

If the determination result produced at the step S3 indicates that a request for a content 11 has not been received, on the other hand, the CPU 31 ends the execution of the processing to transmit the content license 12 and the content 11 without transmitting the content 11 to the user terminal 1.

As described above, the content server 3 transmits a content license 12 and a content 11 associated with the content license 12 to the user terminal 1.

In an embodiment represented by the flowchart shown in FIG. 16, a content license 12 and a content 11 are transmitted from the content server 3 to a user terminal 1 in response to requests made by the user terminal 1. It is to be noted, however, that timings to transmit the content 11 and the content license 12 are not limited to those of the embodiment represented by the flowchart shown in FIG. 16. For example, the content 11 and the content license 12 can also be transmitted at the same time. As an alternative, the content license 12 can also be transmitted after the content 11.

Figure 17:
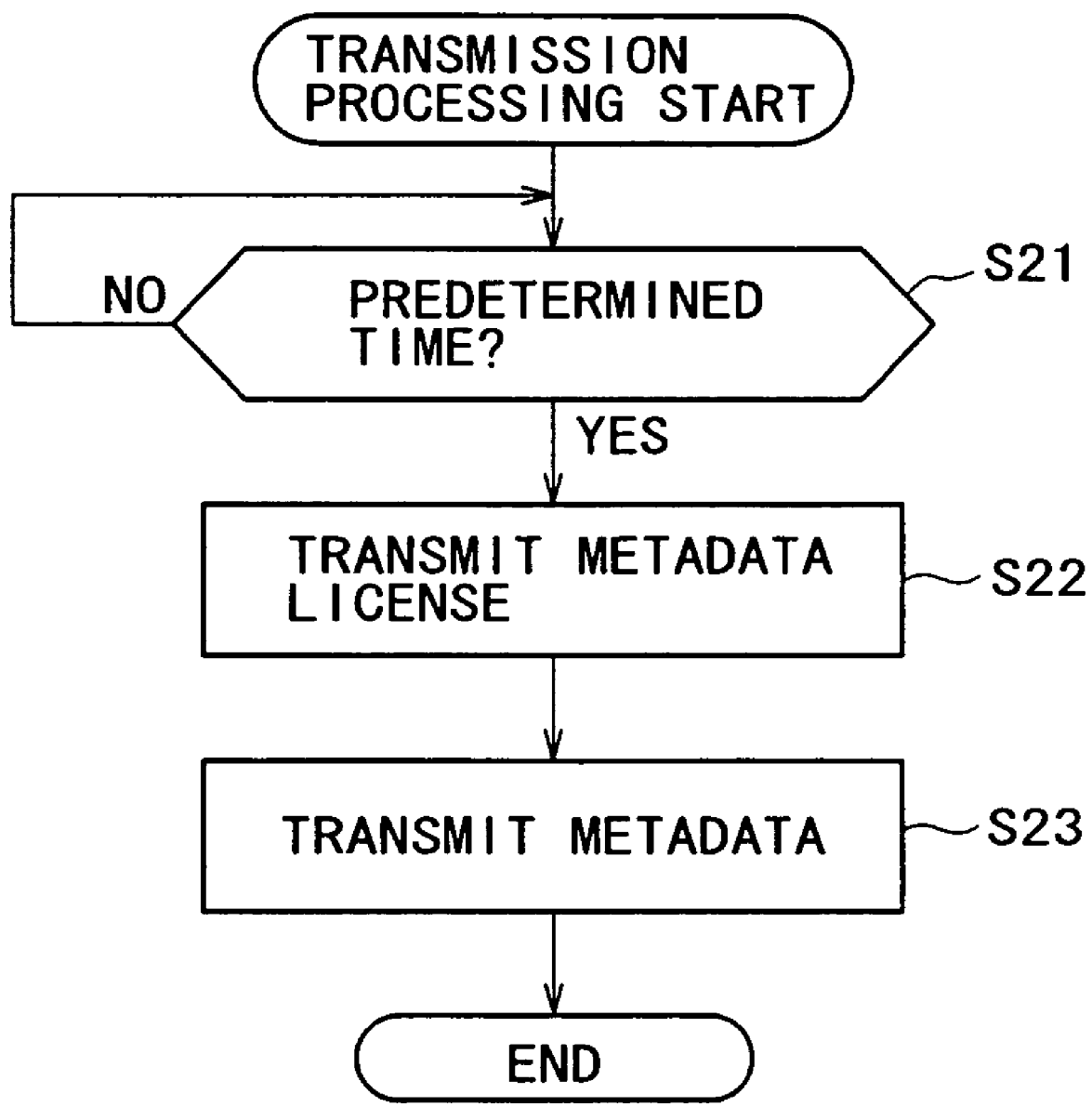
FIG. 17 shows a flowchart referred to in explanation of transmission processing carried out by a metadata server employed in the content-providing system shown in FIG. 1.

Next, transmission processing carried out by the metadata server 4 is explained by referring to a flowchart shown in FIG. 17. In an embodiment represented by the flowchart shown in FIG. 17, a metadata provider determines times to distribute metadata 21 and a metadata license 22 in advance.

First of all, at a step S21, the CPU 31 employed in the metadata server 4 measures time on the basis a clock signal generated internally and determines whether or not the measured time coincides with a predetermined point of time, entering a state of waiting for the measured time to coincide with the predetermined point of time. As the result of the determination indicates that the measured time coincides with the predetermined point of time, the flow of the transmission processing goes on to a step S22 at which the CPU 31 reads out a metadata license 22 of target metadata 21 from the storage unit 38 and controls the communication unit 39 to transmit the metadata license 22 read out from the storage unit 38 to a user terminal 1 by way of the network 2. Then, the flow of the transmission processing goes on to a step S23.

At the step S23, the CPU 31 reads out the metadata 21 from the storage unit 38 and controls the communication unit 39 to transmit the metadata 21 read out from the storage unit 38 to the user terminal 1 by way of the network 2. Then, the execution of the transmission processing is ended.

As described above, the metadata server 4 transmits a metadata license 22 and metadata 21 associated with the metadata license 22 to the user terminal 1.

In an embodiment represented by the flowchart shown in FIG. 17, a metadata license 22 and metadata 21 are transmitted from the metadata server 4 to a user terminal 1 in response to requests made by the user terminal 1. It is to be noted, however, that timings to transmit the metadata 21 and the metadata license 22 are not limited to those of the embodiment represented by the flowchart shown in FIG. 17. For example, much like the embodiment represented by the flowchart shown in FIG. 16, the metadata 21 and the metadata license 22 can also be transmitted at the same time. As an alternative, the metadata license 22 can also be transmitted after the metadata 21.

Figure 18:
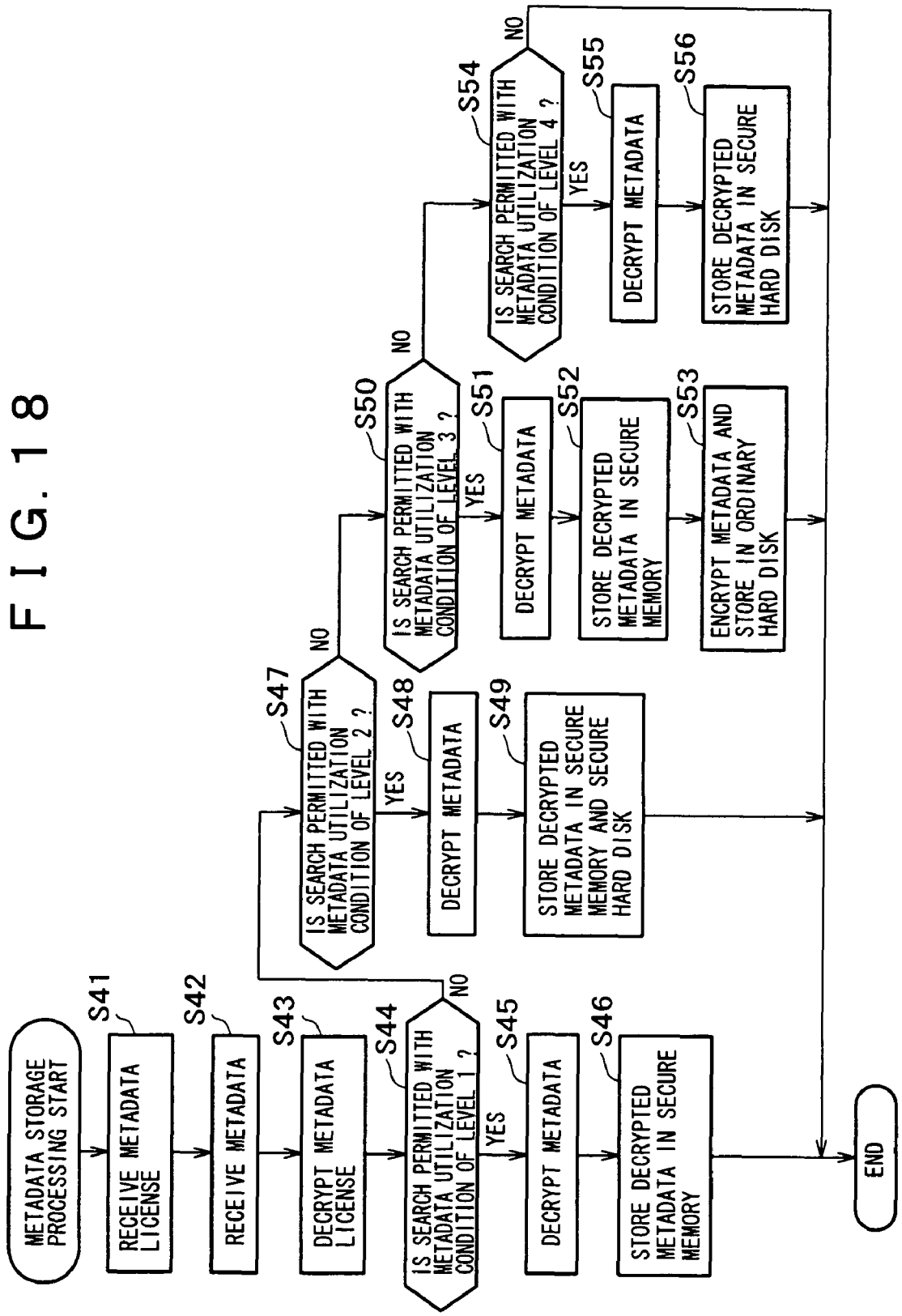
FIG. 18 shows a flowchart referred to in explanation of processing carried out by the user terminal employed in the content-providing system shown in FIG. 1 to store metadata.

Next, processing carried out by the user terminal 1 to store metadata is explained by referring to a flowchart shown in FIG. 18. For example, the metadata server 4 transmits a metadata license 22 and metadata 21 associated with the metadata license 22 to the user terminal 1 by way of the network 2 respectively at the steps S22 and S23 of the flowchart shown in FIG. 17 as described above. The metadata license 22 is a license encrypted by using a metadata-provider encryption key based on the PKI of a metadata provider. On the other hand, the metadata 21 is metadata encrypted by using a metadata encryption key 162.

First of all, at a step S41, the reception unit 101 employed in the user terminal 1 receives the metadata license 22 from the metadata server 4 and supplies the received metadata license 22 to the metadata-license decryption unit 201. Then, the flow of the metadata storage processing goes on to a step S42. At the step S42, the reception unit 101 receives the metadata 21 from the metadata server 4 and supplies the received metadata 21 to the metadata decryption unit 211. Then, the flow of the metadata storage processing goes on to a step S43.

At the step S43, the metadata-license decryption unit 201 decrypts the metadata license 22 received from the reception unit 101 by using a metadata-provider public key 171 acquired in advance. The metadata-license decryption unit 201 then splits the decrypted metadata license 22 into a metadata utilization condition 161 and a metadata encryption key 162, supplying the metadata utilization condition 161 and the metadata encryption key 162 to the utilization condition determination process unit 202. Then, the flow of the metadata storage processing goes on to a step S44.

At the step S44, the utilization condition determination process unit 202 determines whether or not the metadata utilization condition 161 received from the metadata-license decryption unit 201 indicates that the user terminal 1 is a terminal entitled to a right to utilize the metadata 21 as well as allowed to carry out a search operation based on the metadata 21 and the security level is set at level 1 as a condition for exercising the right.

If the utilization condition determination process unit 202 determines at the step S44 that the metadata utilization condition 161 indicates that the user terminal 1 is a terminal entitled to a right to utilize the metadata 21 as well as allowed to carry out a search operation based on the metadata 21 and the security level is set at level 1 as a condition for exercising the right, the flow of the metadata storage processing goes on to a step S45 at which the utilization condition determination process unit 202 supplies the metadata encryption key 162 to the metadata decryption unit 211 and controls the metadata decryption unit 211 to decrypt the metadata 21 received from the reception unit 101. Then, the flow of the metadata storage processing goes on to a step S46 at which the utilization condition determination process unit 202 controls the metadata decryption unit 211 to store the decrypted metadata 21 in the secure memory 301 of the metadata DB 212. To be more specific, at the step S46, the metadata decryption unit 211 splits the decrypted metadata 21 into an index table 311 and a data block 312, storing the index table 311 and the data block 312 in the secure memory 301 of the metadata DB 212-1. Finally, the execution of the processing to store the metadata 21 is ended.

If the utilization condition determination process unit 202 determines at the step S44 that the metadata utilization condition 161 indicates that the user terminal 1 is a terminal neither entitled to a right to utilize the metadata 21 nor allowed to carry out a search operation based on the metadata 21 or the security level is not set at level 1 as a condition for exercising the right, on the other hand, the flow of the metadata storage processing goes on to a step S47 at which the utilization condition determination process unit 202 determines whether or not the metadata utilization condition 161 indicates that the user terminal 1 is a terminal entitled to a right to utilize the metadata 21 as well as allowed to carry out a search operation based on the metadata 21 and the security level is set at level 2 as a condition for exercising the right.

If the utilization condition determination process unit 202 determines at the step S47 that the metadata utilization condition 161 indicates that the user terminal 1 is a terminal entitled to a right to utilize the metadata 21 as well as allowed to carry out a search operation based on the metadata 21 and the security level is set at level 2 as a condition for exercising the right, the flow of the metadata storage processing goes on to a step S48 at which the utilization condition determination process unit 202 supplies the metadata encryption key 162 to the metadata decryption unit 211 and controls the metadata decryption unit 211 to decrypt the metadata 21 received from the reception unit 101. Then, the flow of the metadata storage processing goes on to a step S49 at which the utilization condition determination process unit 202 controls the metadata decryption unit 211 to store the decrypted metadata 21 in the secure memory 301 and the secure hard disk 303, which are included in the metadata DB 212. To be more specific, at the step S49, the metadata decryption unit 211 splits the decrypted metadata 21 into an index table 311 and a data block 312, storing the index table 311 in the secure memory 301 of the metadata DB 212-2 and the data block 312 in the secure hard disk 303 of the metadata DB 212-2. Finally, the execution of the processing to store the metadata 21 is ended.

If the utilization condition determination process unit 202 determines at the step S47 that the metadata utilization condition 161 indicates that the user terminal 1 is a terminal neither entitled to a right to utilize the metadata 21 nor allowed to carry out a search operation based on the metadata 21 or the security level is not set at level 2 as a condition for exercising the right, on the other hand, the flow of the metadata storage processing goes on to a step S50 at which the utilization condition determination process unit 202 determines whether or not the metadata utilization condition 161 indicates that the user terminal 1 is a terminal entitled to a right to utilize the metadata 21 as well as allowed to carry out a search operation based on the metadata 21 and the security level is set at level 3 as a condition for exercising the right.

If the utilization condition determination process unit 202 determines at the step S50 that the metadata utilization condition 161 indicates that the user terminal 1 is a terminal entitled to a right to utilize the metadata 21 as well as allowed to carry out a search operation based on the metadata 21 and the security level is set at level 3 as a condition for exercising the right, the flow of the metadata storage processing goes on to a step S51 at which the utilization condition determination process unit 202 supplies the metadata encryption key 162 to the metadata decryption unit 211 and controls the metadata decryption unit 211 to decrypt the metadata 21 received from the reception unit 101. Then, the flow of the metadata storage processing goes on to a step S52 at which the utilization condition determination process unit 202 controls the metadata decryption unit 211 to store an index table 311 of the decrypted metadata 21 in the secure memory 301 included in the metadata DB 212. Then, the flow of the metadata storage processing goes on to a step S53 at which a data block 312 of the metadata 21 is re-encrypted and stored in the ordinary hard disk 304 of the metadata DB 212.

To be more specific, at the step S52, the metadata decryption unit 211 splits the decrypted metadata 21 into the index table 311 and the data block 312 and stores the index table 311 in the secure memory 301 of the metadata DB 212-3. Then, the flow of the metadata storage processing goes on to a step S53 at which the data block 312 of the metadata 21 is re-encrypted and stored in the ordinary hard disk 304 of the metadata DB 212-3. Finally, the execution of the processing to store the metadata 21 is ended.

If the utilization condition determination process unit 202 determines at the step S50 that the metadata utilization condition 161 indicates that the user terminal 1 is a terminal neither entitled to a right to utilize the metadata 21 nor allowed to carry out a search operation based on the metadata 21 or the security level is not set at level 3 as a condition for exercising the right, on the other hand, the flow of the metadata storage processing goes on to a step S54 at which the utilization condition determination process unit 202 determines whether or not the metadata utilization condition 161 indicates that the user terminal 1 is a terminal entitled to a right to utilize the metadata 21 as well as allowed to carry out a search operation based on the metadata 21 and the security level is set at level 4 as a condition for exercising the right.

If the utilization condition determination process unit 202 determines at the step S54 that the metadata utilization condition 161 indicates that the user terminal 1 is a terminal entitled to a right to utilize the metadata 21 as well as allowed to carry out a search operation based on the metadata 21 and the security level is set at level 4 as a condition for exercising the right, the flow of the metadata storage processing goes on to a step S55 at which the utilization condition determination process unit 202 supplies the metadata encryption key 162 to the metadata decryption unit 211 and controls the metadata decryption unit 211 to decrypt the metadata 21 received from the reception unit 101. Then, the flow of the metadata storage processing goes on to a step S56 at which the utilization condition determination process unit 202 controls the metadata decryption unit 211 to store an index table 311 and a data block 312 of the decrypted metadata 21 in the secure hard disk 303 of the metadata DB 212.

To be more specific, at the step S56, the metadata decryption unit 211 splits the decrypted metadata 21 into the index table 311 and the data block 312, storing the index table 311 and the data block 312 in the secure hard disk 303 of the metadata DB 212-4. Finally, the execution of the processing to store the metadata 21 is ended.

If the utilization condition determination process unit 202 determines at the step S54 that the metadata utilization condition 161 indicates that the user terminal 1 is a terminal neither entitled to a right to utilize the metadata 21 nor allowed to carry out a search operation based on the metadata 21 or the security level is not set at level 4 as a condition for exercising the right, on the other hand, the execution of the processing to store the metadata 21 is ended without decoding and storing the metadata 21.

As described above, in the user terminal 1, the metadata 21 is stored in a tamper-proof area included in the metadata DB 212 as an area selected in dependence on the security level of the metadata utilization condition 161, or stores in an ordinary area included in the metadata DB 212 as an area other than tamper-proof areas. Thus, an operation to steal the metadata 21 can be avoided to a certain degree dependent on the security level of the metadata utilization condition 161. In the case of a user terminal 1 having no tamper-proof areas provided for the security levels, operations to decrypt and store metadata 21 are prohibited.

In the embodiment represented by the flowchart shown in FIG. 18, if the user terminal 1 is determined to be a user terminal 1 allowed to carry out a search operation based on metadata 21, the metadata 21 is decrypted, expanded and stored. It is to be noted, however, that if the user terminal 1 is determined to be a user terminal 1 allowed to merely store metadata 21, the metadata 21 is neither decrypted nor expanded. Instead, the metadata 21 is merely stored in an area predetermined in accordance with the security level of the metadata utilization condition 161 in a state of being encrypted.

Figure 19:
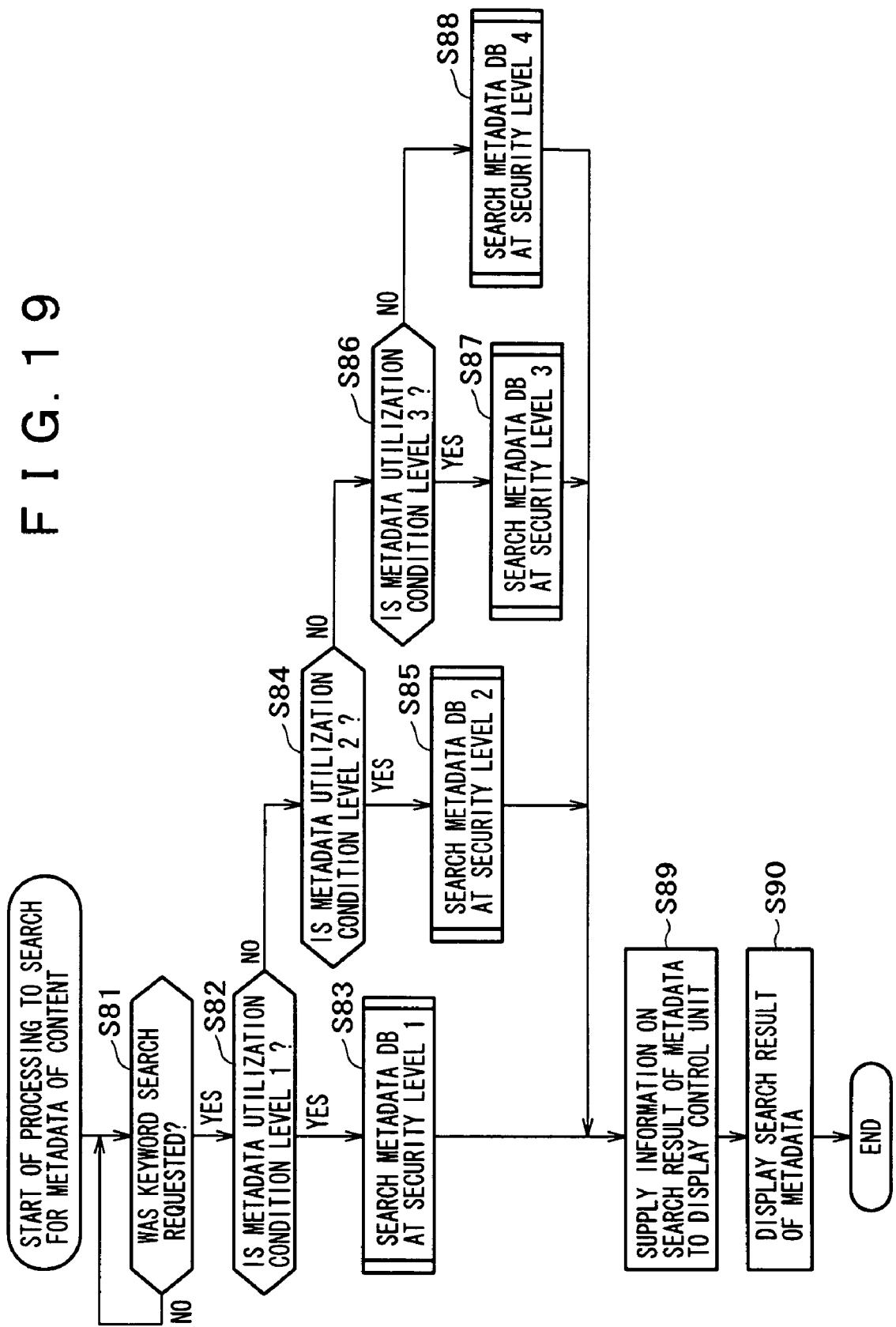
FIG. 19 shows a flowchart referred to in explanation of processing carried out by the content server employed in the content-providing system shown in FIG. 1 to search for metadata of a desired content.

By referring to a flowchart shown in FIG. 19, the following description explains content search processing carried out by a user terminal 1 to search pieces of metadata 21 stored in the user terminal 1 for specific metadata 21 of a desired content 11. The content search processing is carried out when the user enters a keyword for searching for metadata 21 of a desired content 11 by operating typically a mouse or keyboard of the input unit 36.

First of all, at a step S81, the utilization condition determination process unit 202 determines whether or not a request for a search operation based on a keyword has been received, entering a state of waiting for such a request to be made. As a result of the determination indicates that an operation signal has been received through the input unit 36 as a signal representing an operation carried out by the user to make a request for a search operation based on a keyword as an operation to search for metadata 21, the flow of the content search processing goes on to a step S82 to determine whether or not the security level of the metadata utilization condition 161 for the metadata 21 stored in the metadata DB 212 is level 1. If a result of the determination indicates that the security level of the metadata utilization condition 161 for the metadata 21 stored in the metadata DB 212 is level 1, the flow of the content search processing goes on to a step S83 at which the metadata search unit 213 is controlled to carry out an operation to search the metadata DB 212 for the metadata 21 at security level 1.

Figure 20:
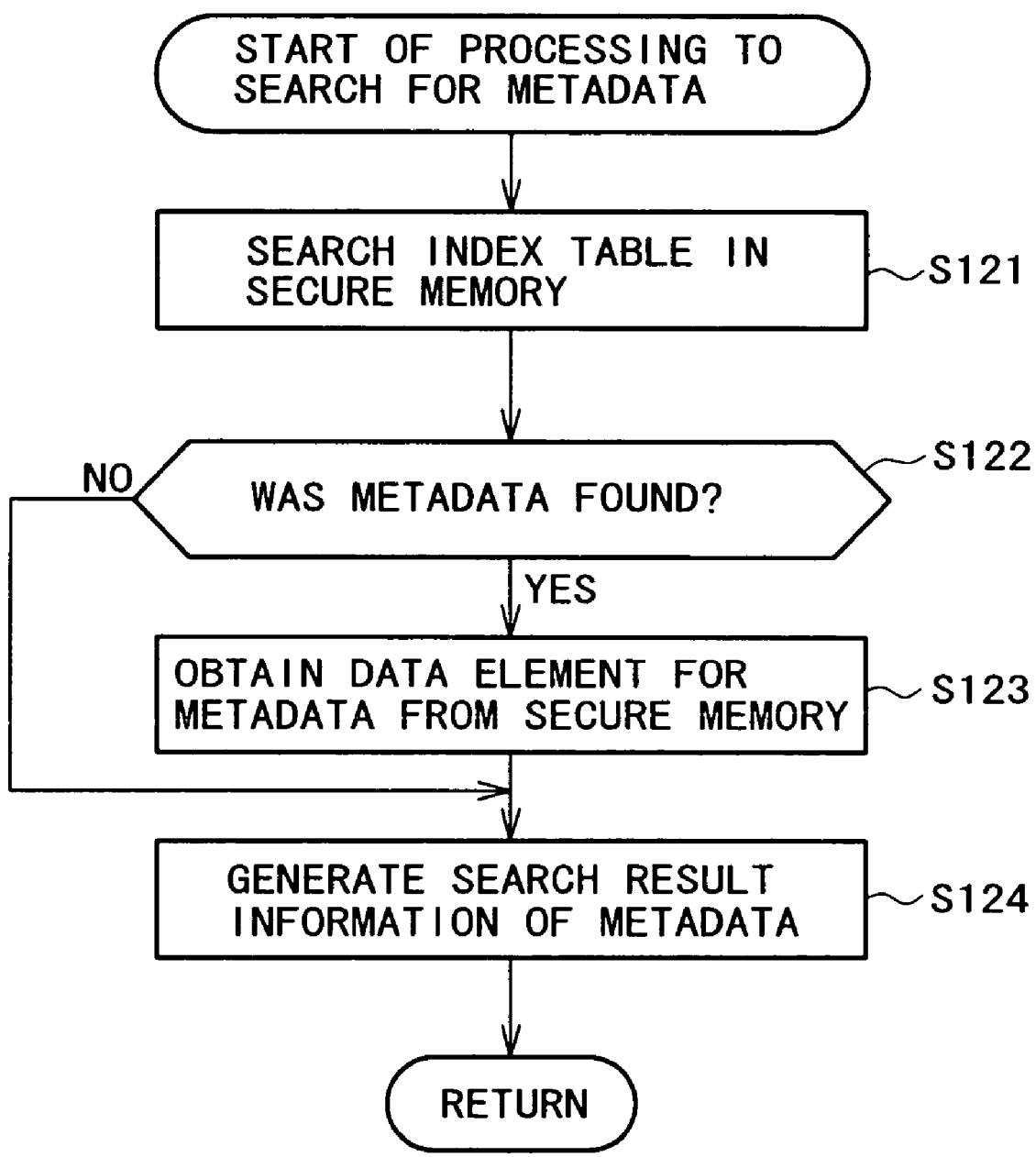
FIG. 20 shows a flowchart referred to in explanation of processing carried out at a step S83 of the flowchart shown in FIG. 19 to search a meta DB at security level 1.

The operation carried out at the step S83 to search the metadata DB 212 for metadata 21 is explained briefly by referring to a flowchart shown in FIG. 20 as follows. First of all, at a step S121, the index table 311 stored in the metadata DB 212-1 is searched for metadata 21 corresponding to a keyword included in the request. If a determination result produced at the following step S122 indicates that such metadata 21 has been found from the index table 311, the search operation goes on to a step S123 to search the data block 312 stored in the metadata DB 212-1 for a data element corresponding to the metadata 21 found from the index table 311. Then, at the next step S124, search result information for the desired content 11 is generated on the basis of the data element found from the data block 312. Finally, the flow of the search operation goes on to a step S89 of the flowchart shown in FIG. 19.

If the determination result produced at the step S82 indicates that the security level of the metadata utilization condition 161 for the metadata 21 stored in the metadata DB 212 is not level 1, on the other hand, the flow of the content search processing goes on to a step S84 to determine whether or not the security level of the metadata utilization condition 161 for the metadata 21 stored in the metadata DB 212 is level 2. If a result of the determination indicates that the security level of the metadata utilization condition 161 for the metadata 21 stored in the metadata DB 212 is level 2, the flow of the content search processing goes on to a step S85 at which the metadata search unit 213 is controlled to carry out an operation to search the metadata DB 212 for the metadata 21 at security level 2.

Figure 21:
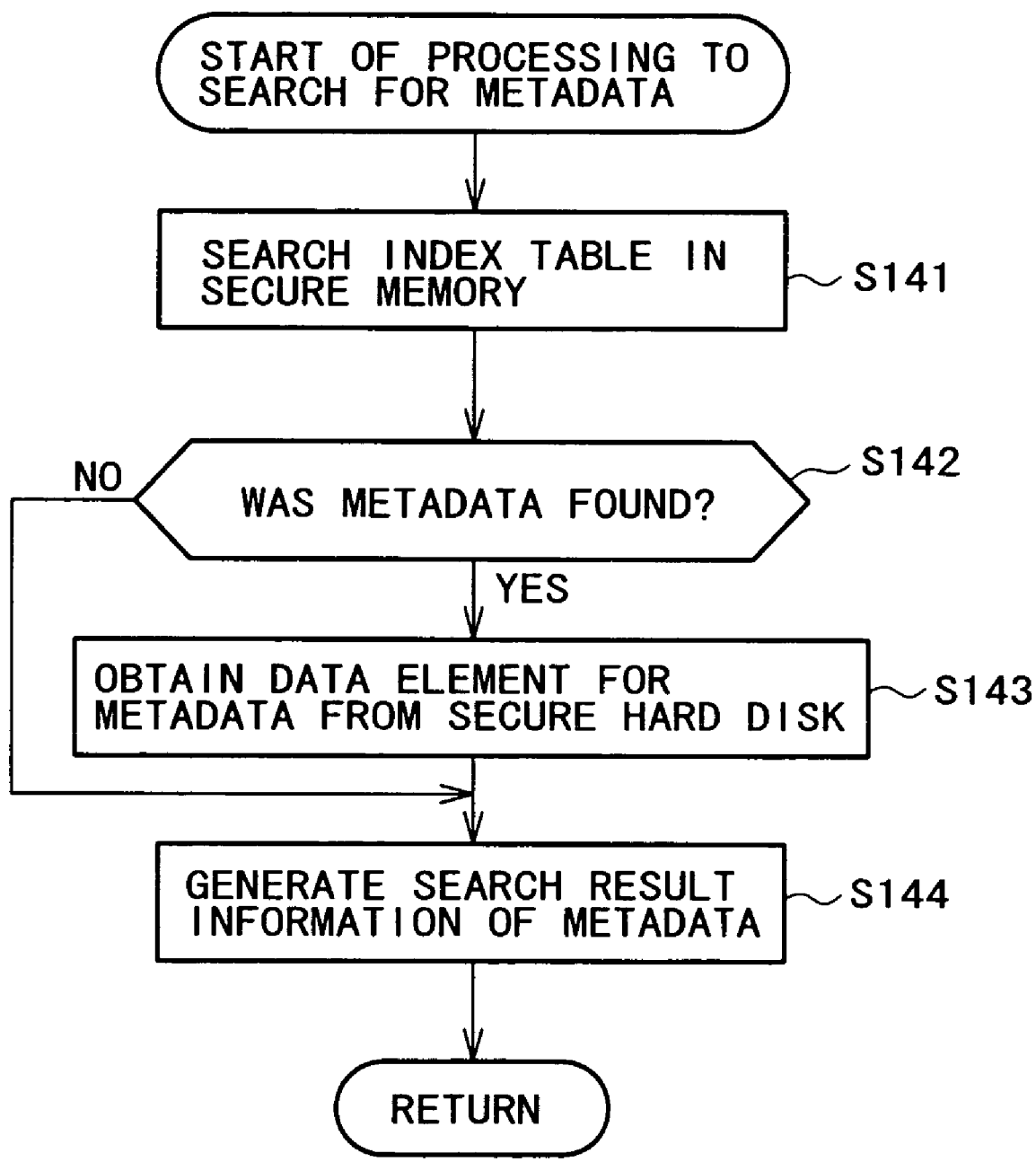
FIG. 21 shows a flowchart referred to in explanation of processing carried out at a step S85 of the flowchart shown in FIG. 19 to search the meta DB at security level 2.

The operation carried out at the step S85 to search the metadata DB 212 for metadata 21 is explained briefly by referring to a flowchart shown in FIG. 21 as follows. First of all, at a step S141, the index table 311 stored in the metadata DB 212-2 is searched for metadata 21 corresponding to a keyword included in the request. If a determination result produced at the following step S142 indicates that such metadata 21 has been found from the index table 311, the search operation goes on to a step S143 to search the data block 312 stored in the metadata DB 212-2 for a data element corresponding to the metadata 21 found from the index table 311. Then, at the next step S144, search result information for the desired content 11 is generated on the basis of the data element found from the data block 312. Finally, the flow of the search operation goes on to the step S89 of the flowchart shown in FIG. 19.

If the determination result produced at the step S84 indicates that the security level of the metadata utilization condition 161 for the metadata 21 stored in the metadata DB 212 is not level 2, on the other hand, the flow of the content search processing goes on to a step S86 to determine whether or not the security level of the metadata utilization condition 161 for the metadata 21 stored in the metadata DB 212 is level 3. If a result of the determination indicates that the security level of the metadata utilization condition 161 for the metadata 21 stored in the metadata DB 212 is level 3, the flow of the content search processing goes on to a step S87 at which the metadata search unit 213 is controlled to carry out an operation to search the metadata DB 212 for the metadata 21 at security level 3.

Figure 22:
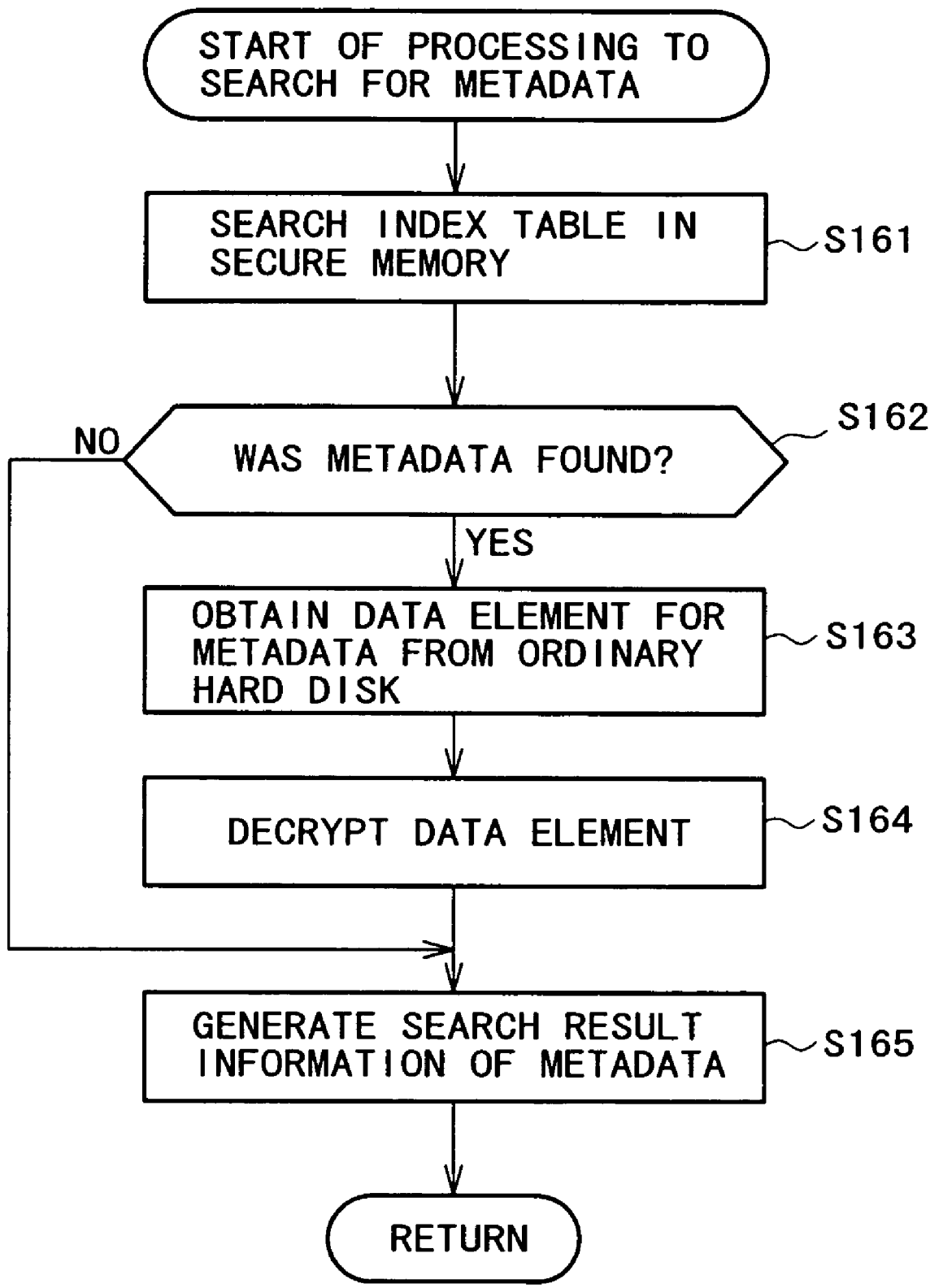
FIG. 22 shows a flowchart referred to in explanation of processing carried out at a step S87 of the flowchart shown in FIG. 19 to search the meta DB at security level 3.

The operation carried out at the step S87 to search the metadata DB 212 for metadata 21 is explained briefly by referring to a flowchart shown in FIG. 22 as follows. First of all, at a step S161, the index table 311 stored in the metadata DB 212-3 is searched for metadata 21 corresponding to a keyword included in the request. If a determination result produced at the following step S162 indicates that such metadata 21 has been found from the index table 311, the search operation goes on to a step S163 to search the data block 312 stored in the metadata DB 212-3 for a data element corresponding to the metadata 21 found from the index table 311. Then, at the next step S164, the data element is decrypted. Subsequently, at the next step S165, search result information for the desired content 11 is generated on the basis of the data element found from the data block 312. Finally, the flow of the search operation goes on to the step S89 of the flowchart shown in FIG. 19.

If the determination result produced at the step S86 indicates that the security level of the metadata utilization condition 161 for the metadata 21 stored in the metadata DB 212 is not level 3, that is, if the security level of the metadata utilization condition 161 for the metadata 21 stored in the metadata DB 212 is level 4, on the other hand, the flow of the content search processing goes on to a step S88 at which the metadata search unit 213 is controlled to carry out an operation to search the metadata DB 212 for the metadata 21 at security level 4.

Figure 23:
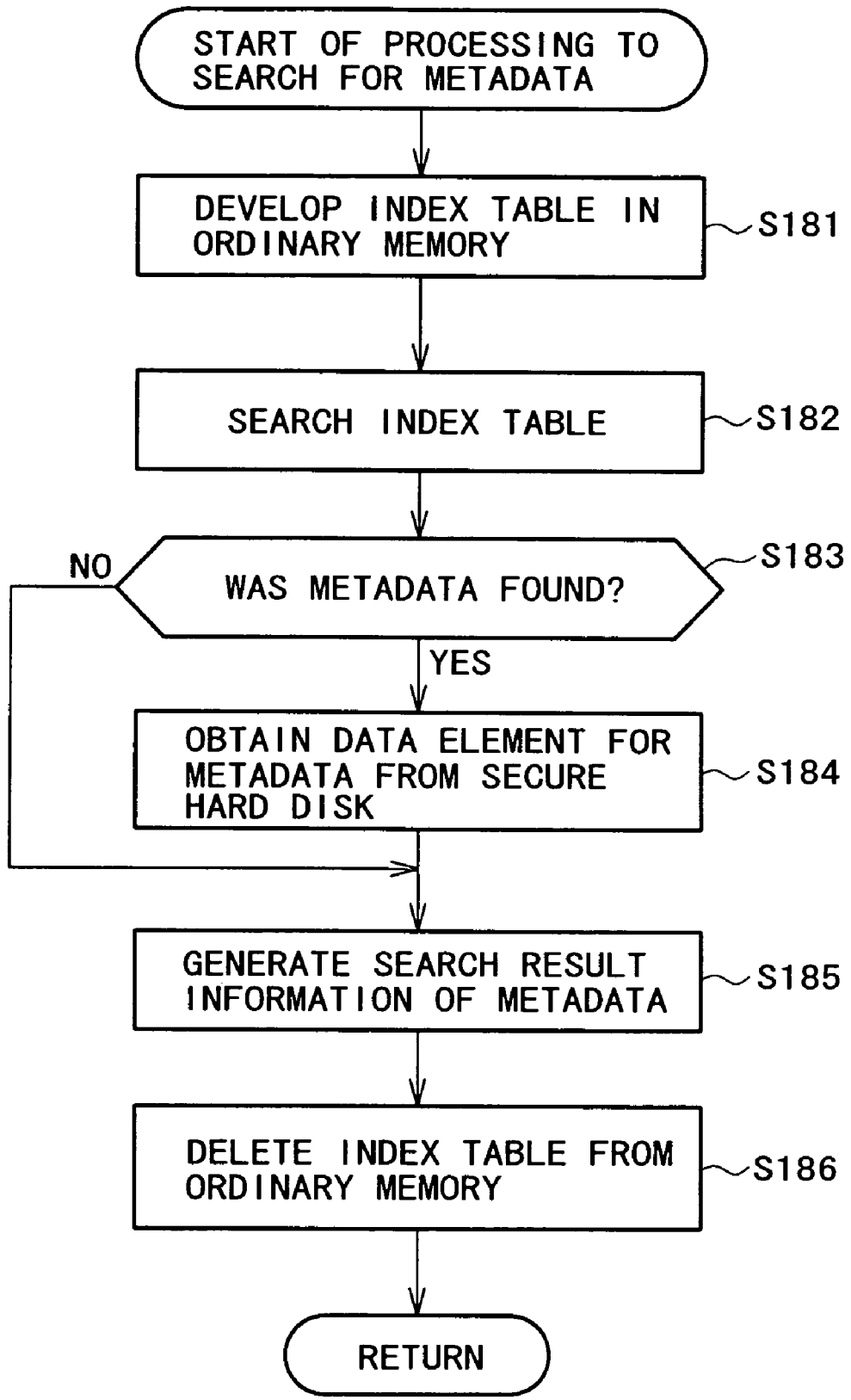
FIG. 23 shows a flowchart referred to in explanation of processing carried out at a step S88 of the flowchart shown in FIG. 19 to search the meta DB at security level 4.

The operation carried out at the step S88 to search the metadata DB 212 for metadata 21 is explained briefly by referring to a flowchart shown in FIG. 23 as follows. First of all, at a step S181, an index table 313 is developed in the ordinary memory 302 of the metadata DB 212-4 from the index table 311 stored in the metadata DB 212-4. Then, at the following step S182, the index table 313 is searched for metadata 21 corresponding to a keyword included in the request. If a determination result produced at the following step S183 indicates that such metadata 21 has been found from the index table 313, the search operation goes on to a step S184 to search the data block 312 stored in the metadata DB 212-4 for a data element corresponding to the metadata 21 found from the index table 311. Then, at the next step S185, search result information for the desired content 11 is generated on the basis of the data element found from the data block 312. Subsequently, at the next step S186, the index table 313 is deleted from the ordinary memory 302. Finally, the flow of the search operation goes on to the step S89 of the flowchart shown in FIG. 19.

At the step S89, the metadata search unit 213 supplies the search result for the desired content 11 to the metadata display control unit 214. Then, the search processing goes on to a step S90. At the step S90, the metadata display control unit 214 displays a picture based on the search result received from the metadata search unit 213 as a result for the content 11 on a monitor of the output unit 37.

It is to be noted that, if the metadata 21 for the desired content 11 is not found in the user terminal 1 during the processing to search for the metadata 21 as described above, the metadata display control unit 214 displays a message stating that the metadata 21 corresponding to the keyword specified in the request does not exist in the user terminal 1 or a query asking the user a question as to whether or not the user desires an operation to search for the desired metadata 21 through the network 2. If the user desires an operation to search for the desired metadata 21 through the network 2, a request for such a search operation is transmitted to the metadata server 4 to acquire the metadata 21.

Next, the operation carried out at the step S83 of the flowchart shown in FIG. 19 to search the metadata DB 212 for metadata 21 at security level 1 is explained in detail by referring to the flowchart shown in FIG. 20 as follows. In the case of security level 1, the index table 311 of the metadata 21 and the data block 312 associated with the index table 311 are stored in the secure memory 301 of the metadata DB 212-1.

When a keyword of a search object is received through the utilization condition determination process unit 202, at a step S121, the metadata search unit 213 searches the index table 311 stored in the secure memory 301 of the metadata DB 212-1 for metadata 21 corresponding to the keyword. Then, the flow of the search operation goes on to a step S122.

At the step S122, the metadata search unit 213 determines whether or not the metadata 21 corresponding to the keyword has been found in the index table 311. If a result of the determination indicates that such metadata 21 has been found from the index table 311, the search operation goes on to a step S123 to search the data block 312 stored in the secure memory 301 of the metadata DB 212-1 for a data element corresponding to the metadata 21 found from the index table 311, and acquire the data element. Then, the flow of the search operation goes on to a step S124.

If the determination result produced by the metadata search unit 213 at the step S122 indicates that the metadata 21 corresponding to the keyword does not exist in the index table 311, on the other hand, the flow of the search operation goes on directly to the step S124, skipping the processing of the step S123. At the step S124, the metadata search unit 213 generates search result information for the desired content 11 on the basis of the data element found in the search as a data element of the data block 312. The search result information may indicate that the metadata 21 corresponding to the keyword does not exist in the index table 311. Finally, the flow of the search operation goes on to the step S89 of the flowchart shown in FIG. 19.

Next, the operation carried out at the step S85 of the flowchart shown in FIG. 19 to search the metadata DB 212 for metadata 21 at security level 2 is explained in detail by referring to the flowchart shown in FIG. 21 as follows. In the case of security level 2, the index table 311 of the metadata 21 is stored in the secure memory 301 of the metadata DB 212-2 and the data block 312 associated with the index table 311 is stored in the secure hard disk 303 of the metadata DB 212-2.

When a keyword of a search object is received through the utilization condition determination process unit 202, at a step S141, the metadata search unit 213 searches the index table 311 stored in the secure memory 301 of the metadata DB 212-2 for metadata 21 corresponding to the keyword. Then, the flow of the search operation goes on to a step S142.

At the step S142, the metadata search unit 213 determines whether or not the metadata 21 corresponding to the keyword has been found in the index table 311. If a result of the determination indicates that such metadata 21 has been found from the index table 311, the search operation goes on to a step S143 to search the data block 312 stored in the secure hard disk 303 of the metadata DB 212-2 for a data element corresponding to the metadata 21 found from the index table 311 and acquire the data element. Then, the flow of the search operation goes on to a step S144.

If the determination result produced by the metadata search unit 213 at the step S142 indicates that the metadata 21 corresponding to the keyword does not exist in the index table 311, on the other hand, the flow of the search operation goes on directly to the step S144, skipping the processing of the step S143. At the step S144, the metadata search unit 213 generates search result information for the desired content 11 on the basis of the data element found in the search. The search result information may indicate that the metadata 21 corresponding to the keyword does not exist in the index table 311. Finally, the flow of the search operation goes on to the step S89 of the flowchart shown in FIG. 19.

Next, the operation carried out at the step S87 of the flowchart shown in FIG. 19 to search the metadata DB 212 for metadata 21 at security level 3 is explained in detail by referring to the flowchart shown in FIG. 22 as follows. In the case of security level 3, the index table 311 of the metadata 21 is stored in the secure memory 301 of the metadata DB 212-3 and the data block 312 associated with the index table 311 is stored in the ordinary hard disk 304 of the metadata DB 212-3.

When an operation signal representing a keyword of a search object is received through the utilization condition determination process unit 202, at a step S161, the metadata search unit 213 searches the index table 311 stored in the secure memory 301 of the metadata DB 212-3 for metadata 21 corresponding to the keyword. Then, the flow of the search operation goes on to a step S162.

At the step S162, the metadata search unit 213 determines whether or not the metadata 21 corresponding to the keyword has been found in the index table 311. If a result of the determination indicates that such metadata 21 has been found from the index table 311, the search operation goes on to a step S163 to search the data block 312 stored in the ordinary hard disk 304 of the metadata DB 212-3 for a data element corresponding to the metadata 21 found from the index table 311 and output the data element found from the ordinary hard disk 304 to the metadata decryption unit 211. Then, the flow of the search operation goes on to a step S164.

At the step S164, receiving the encrypted data element, the metadata decryption unit 211 decrypts the data element and supplies the decrypted data element to the metadata search unit 213. Then, the flow of the search operation goes on to a step S165.

If the determination result produced by the metadata search unit 213 at the step S162 indicates that the metadata 21 corresponding to the keyword does not exist in the index table 311, on the other hand, the flow of the search operation goes on directly to the step S165, skipping the pieces of processing of the steps S163 and S164. At the step S165, the metadata search unit 213 generates search result information for the desired content 11 on the basis of the data element found in the search. The search result information may indicate that the metadata 21 corresponding to the keyword does not exist in the index table 311. Finally, the flow of the search operation goes on to the step S89 of the flowchart shown in FIG. 19.

Next, the operation carried out at the step S88 of the flowchart shown in FIG. 19 to search the metadata DB 212 for metadata 21 at security level 4 is explained in detail by referring to the flowchart shown in FIG. 23 as follows. In the case of security level 4, the index table 311 of the metadata 21 and the data block 312 associated with the index table 311 are stored in the secure hard disk 303 of the metadata DB 212-4.

When a keyword of a search object is received through the utilization condition determination process unit 202, at a step S181, the metadata search unit 213 develops the index table 311 stored in the secure hard disk 303 of the metadata DB 212-4 into an index table 313 in the ordinary memory 302 of the metadata DB 212-4. Then, the flow of the search operation goes on to a step S182 at which the metadata search unit 213 searches the index table 313 for metadata 21 corresponding to the keyword. Then, the flow of the search operation goes on to a step S183.

At the step S183, the metadata search unit 213 determines whether or not the metadata 21 corresponding to the keyword has been found in the index table 313. If a result of the determination indicates that such metadata 21 has been found from the index table 313, the flow of the search operation goes on to a step S184 to search the data block 312 stored in the secure hard disk 303 of the metadata DB 212-4 for a data element corresponding to the metadata 21 found from the index table 313 and acquire the data element. Then, the flow of the search operation goes on to a step S185.

If the determination result produced by the metadata search unit 213 at the step S183 indicates that the metadata 21 corresponding to the keyword does not exist in the index table 313, on the other hand, the flow of the search operation goes on directly to the step S185, skipping the processing of the step S184. At the step S185, the metadata search unit 213 generates search result information for the desired content 11 on the basis of the data element found in the search. The search result information may indicate that the metadata 21 corresponding to the keyword does not exist in the index table 313. Then, the flow of the search operation goes on to a step S186.

At the step S186, the metadata search unit 213 deletes the index table 313 developed in the ordinary memory 302 of the metadata DB 212-4, completing the operation to search the metadata DB 212-4 for the metadata 21. Finally, the flow of the search operation goes on to the step S89 of the flowchart shown in FIG. 19.

As described above, in the processing carried out by the user terminal 1 to search the metadata DB 212 for metadata 21 of a desired content 11, in accordance with the security level of the metadata utilization condition 161, the metadata DB 212 is searched for the metadata 21, and then, the metadata DB 212 is searched for a data element corresponding to the metadata 21. Thus, the user terminal 1 is capable of carrying out the search processing at a safety level and a search speed, which are selected in accordance with the security level set for the metadata DB 212. As a result, the user terminal 1 is capable of preventing metadata 21 requiring assured security from being processed in such an unsafe area that the metadata 21 can be stolen and capable of enhancing the protection of copyrights of the metadata 21.

Next, processing to reproduce a content 11 is explained by referring to a flowchart shown in FIG. 24. With reference to a result of the processing represented by the flowchart shown in FIG. 19 as a result obtained for a desired content 11, the user specifies the desired content 11 by operating typically a mouse of the input unit 36.

First of all, at a step S201, the utilization condition determination process unit 222 determines whether or not a request for a content 11 has been received, entering a state of waiting for such a request to be made. As a result of the determination indicates that an operation signal generated by the input unit 36 as a signal representing such a request has been received, the flow of the reproduction processing goes on to a step S202 to determine whether or not a content license 12 for the requested content 11 is available in the user terminal 1 on the basis of the content ID of the content 11. If a result of the determination indicates that the requested content 11 is available in the user terminal 1, the flow of the reproduction processing goes on to a step S203.

At the step S203, on the basis of the content utilization condition 151 of the content license 12, the utilization condition determination process unit 222 determines whether or not the user terminal 1 is allowed to reproduce the content 11. If a result of the determination indicates that the user terminal 1 is allowed to reproduce the content 11, the flow of the reproduction processing goes on to a step S204 at which the content encryption key 152 is supplied to the content decryption unit 234, and the content search unit 233 as well as the content decryption unit 234 are requested to reproduce the content 11 identified by the content ID. Then, the flow of the reproduction processing goes on to a step S205.

At the step S205, the content search unit 233 determines whether or not the content 11 identified by the content ID is available in the content storage unit 232. If a result of the determination indicates that the content 11 identified by the content ID is available in the content storage unit 232, the flow of the reproduction processing goes on to a step S211. If the content search unit 233 determines at the step S205 that the content 11 identified by the content ID is not available in the content storage unit 232, on the other hand, the flow of the reproduction processing goes on to a step S210.

If the determination result produced by the utilization condition determination process unit 222 at the step S202 on the basis of the content ID indicates that the content license 12 for the requested content 11 is not available in the user terminal 1, on the other hand, the flow of the reproduction processing goes on to a step S206 at which the content search unit 233 is controlled on the basis of the content ID to drive the transmission unit 105 to transmit a request for the content license 12 of the content 11 identified by the content ID to the content server 3 by way of the network 2 in order to acquire the content license 12. Then, the flow of the reproduction processing goes on to a step S207.

At this request, the content server 3 transmits the content license 12 to the user terminal 1 by way of the network 2 at the step S2 of the flowchart shown in FIG. 16. The content license 12 is a license encrypted by using a metadata-provider encryption key based on the PKI of a metadata provider. The reception unit 101 employed in the user terminal 1 receives the content license 12 transmitted by the content server 3 and supplies the content license 12 to the content-license decryption unit 221.

At the step S207, the content-license decryption unit 221 decrypts the content license 12 received from the reception unit 101 by using a content-provider public key 172 acquired in advance, splitting the decrypted content license 12 into a content utilization condition 151 and a content encryption key 152. Then, the content-license decryption unit 221 supplies the content utilization condition 151 and the content encryption key 152 to the utilization condition determination process unit 222. Subsequently, at the next step S208, on the basis of the content utilization condition 151, the utilization condition determination process unit 222 determines whether or not the user terminal 1 is allowed to reproduce the content 11 associated with the content license 12. If a result of the determination indicates that the user terminal 1 is allowed to reproduce the content 11, the flow of the reproduction processing goes on to a step S209 at which the utilization condition determination process unit 222 supplies the content encryption key 152 to the content decryption unit 234 and requests the content search unit 233 as well as the content decryption unit 234 to reproduce the content 11 identified by the content ID. Then, the flow of the reproduction processing goes on to the step S210.

At the step S210, on the basis of the content ID identifying the content 11 that the user terminal 1 is allowed to reproduce, the content search unit 233 transmits a request to the content server 3 by way of the transmission unit 105 and the network 2 in order to acquire the content 11 identified by the content ID. Then, the flow of the reproduction processing goes on to the step S211.

At this request made by the user terminal 1, the content server 3 transmits the content 11 identified by the content ID to the user terminal 1 by way of the network 2 at the step S4 of the flowchart shown in FIG. 16. The transmitted content 11 is a content encrypted by using the content encryption key 152. The reception unit 101 employed in the user terminal 1 receives the content 11 from the content server 3 and supplies the content 11 to the content accumulation unit 231. In accordance with a determination result produced by the utilization condition determination process unit 222 on the basis of the content utilization condition 151, the content accumulation unit 231 stores the content 11 in the content storage unit 232.

At the step S211, the content decryption unit 234 decrypts the content 11 stored in the content storage unit 232 by using the content encryption key 152 received from the utilization condition determination process unit 222 and using a tamper-proof area as a work area, outputting the decrypted content 11 to the content display control unit 235. Then, the flow of the reproduction processing goes on to a step S212.

At the step S212, the content display control unit 235 reproduces the content 11 received from the content decryption unit 234 and displays the reproduced content 11 on the monitor employed in the output unit 37. Finally, the execution of the reproduction processing is ended.

If the determination result produced in the step S203 or S208 indicates that the user terminal 1 is not allowed to reproduce the content 11 identified by the content ID, on the other hand, the utilization condition determination process unit 222 ends the execution of the reproduction processing.

As described above, separately from the content utilization condition 151 for a content 11, a metadata utilization condition 161 is provided for each metadata 21, which is to be processed with a timing different from the content 11. Since processing such as operations to store and expand metadata 21 is controlled in accordance with the metadata utilization condition 161 provided for the metadata 21, cost-effective security can be sustained even if the metadata 21 requiring protection of a copyright thereof is expanded earlier than an operation to search for the content 11 associated with the metadata 21. That is to say, the costs of an expensive tamper-proof memory and an expensive tamper-proof hard disk can each be reduced to a minimum depending on the required level of security.

In addition, in accordance with the substance of metadata 21, not only can user terminals 1 allowed to reproduce a user terminal 1 be restricted, but the security level of processing carried out in every user terminal 1 allowed to reproduce a content 11 can also be controlled. Thus, processing can be carried out by a user terminal 1 passing the restriction at a controlled level of security and a user terminal 1 having a security level lower than a level for metadata 21 can be prevented from processing the metadata 21. As a result, operations according to the type of metadata 21 can be carried out whereas distribution and utilization of metadata 21 can be promoted.

In the embodiments described above, a content 11, a content license 12, metadata 21 and a metadata license 22 are presented through the network 2. It is to be noted, however, that the present invention does not limit the unit of distribution to the network 2. For example, the present invention can also be applied to distribution of a content 11, a content license 12, metadata 21 or a metadata license 22 by using a broadcasting wave. To put it concretely, a content license 12, metadata 21 and a metadata license 22 can be multiplexed in a transmitted broadcasting wave. It is to be noted that, in this case, the user terminal 1 must include a tuner for receiving a broadcast wave.

The series of processes described above can be carried out by hardware and/or execution of software. If the series of processes described above is carried out by execution of software, programs composing the software can be installed into a computer embedded in dedicated hardware, a general-purpose personal computer or the like from typically a program-recording medium. By installing a variety of programs into the general-purpose personal computer, the personal computer is capable of carrying out a variety of functions.

The aforementioned program-recording medium for recording the programs to be installed into a computer or a general-purpose personal computer as programs to be executed by the computer or the general-purpose personal computer respectively is package media. As shown in FIG. 2, examples of the package media are the magnetic disk 41 including a flexible disk, the optical disk 42 including a CD-ROM (Compact Disk-Read Only Memory) and a DVD (Digital Versatile Disk), the magneto-optical disk 43 including an MD (Mini Disk, which is a trademark) and the semiconductor memory 44. Instead of installing the programs from the package media, the programs can also be stored in advance in the storage unit 38, which is used for recording the programs temporarily or permanently.

It is to be noted that, in these specifications, steps describing a program recorded in the recording medium include of course processes that can be carried out in an order the steps are described along the time axis. However, the steps may also be processes that do not have to be carried out sequentially along the time axis. That is to say, the steps may also include processes that can be carried out concurrently or individually.

It is also worth noting that, the technical term "system" used in these specifications represents an entire system apparatus comprising a plurality of component apparatus.

What is claimed is:

1. An information-processing system comprising:
    a first information-processing apparatus that includes
        a transmission unit configured to transmit a metadata utilization condition representing information on rights required for utilizing metadata relevant to a content, the metadata being used independently of said content; and
    a second information-processing apparatus that includes
        a reception unit configured to receive said metadata utilization condition from said first information-processing apparatus, the utilization condition including a device security level of the second information-processing apparatus and a list of allowable metadata operations to be performed by the second information-processing apparatus,
        a metadata-processing determination unit configured to determine whether to process metadata based on said metadata utilization condition,
        a metadata-processing unit configured to process said metadata in accordance with said metadata utilization condition when metadata is to be processed, and
        at least one storage unit configured to store the metadata in accordance with the metadata utilization condition,
    wherein the device security level of said second information-processing apparatus is based on a number of secure storage units included in the at least one storage unit.

2. The information-processing system according to claim 1, wherein said second information-processing apparatus further includes:
    a content-processing determination unit configured to determine whether or not a content can be processed on the basis of a content utilization condition representing information on rights required for utilizing said content; and
    a content-processing unit configured to process said content in accordance with said content utilization condition if a determination result produced by said content-processing determination unit indicates that said content can be processed.

3. The information-processing system according to claim 1, wherein said metadata-processing unit further includes:
    a metadata decryption unit configured to decrypt metadata; and
    a storage control unit configured to control an operation to store said metadata decrypted by said metadata decryption unit in the at least one storage unit.

4. An information-processing apparatus for receiving a content, said information-processing apparatus comprising:
    a reception unit configured to receive, from another information-processing apparatus, a metadata utilization condition representing information on rights required for utilizing metadata relevant to said content, the metadata being used independently of said content, the metadata utilization condition including a device security level for the information processing apparatus and a list of allowed operations to be performed on the metadata by the information-processing apparatus;
    a metadata-processing determination unit configured to determine whether to process metadata based on said metadata utilization condition received by said reception unit;
    a metadata-processing unit configured to process said metadata in accordance with said metadata utilization condition when said metadata is to be processed; and
    at least one storage unit configured to store the metadata in accordance with the metadata utilization condition,
    wherein the device security level of said information-processing apparatus is based on a number of secure storage units included in the at least one storage unit.

5. The information-processing apparatus according to claim 4, wherein said metadata utilization condition further includes a metadata identifier or a condition relevant to a target person allowed to utilize metadata or having a right to use the metadata, a device security level or operations.

6. The information-processing apparatus according to claim 4, said information-processing apparatus further comprising:
    a content-processing determination unit configured to determine whether or not a content can be processed on the basis of a content utilization condition representing information on rights required for utilizing said content; and a content-processing unit configured to process said content in accordance with said content utilization condition if a determination result produced by said content-processing determination unit indicates that said content can be processed.

7. The information-processing apparatus according to claim 4, wherein said metadata-processing unit includes:

a metadata-decryption unit configured to decrypt metadata; and a storage control unit configured to control an operation to store said metadata decrypted by said metadata decryption unit in the at least one storage unit.

8. An information-processing method causing an information-processing apparatus to receive a content, comprising:

receiving, at a reception unit, a metadata utilization condition representing information on rights required for utilizing metadata relevant to said content, the metadata being utilized independently of said content, the metadata utilization condition being received from another information-processing apparatus, the metadata utilization condition including a device security level of said information-processing apparatus and a list of potential operations to be performed on the metadata by the information-processing apparatus;

determining, in a metadata-processing determination unit, whether to process said metadata based on said metadata utilization condition;

processing said metadata in accordance with said metadata utilization condition when said metadata is to be processed; and storing the metadata in at least one storage unit according to the metadata utilization condition, wherein the device security level of said information-processing apparatus is based on a number of secure storage units included in the at least one storage unit.

9. A computer-readable storage medium adopted by an information-processing apparatus on which program instructions to be executed by a computer to carry out processing to receive a content are recorded, wherein said program instructions comprise:

receiving a metadata utilization condition representing information on rights required for utilizing metadata relevant to said content, the metadata being utilized independently of said content, the metadata utilization condition being received from another information-processing apparatus, the metadata utilization condition including a device security level of said information-processing apparatus and a list of potential operations to be performed on the metadata by the information-processing apparatus;

determining whether to process said metadata based on said metadata utilization condition;

processing said metadata in accordance with said metadata utilization condition when said metadata is to be processed; and storing the metadata in at least one storage unit according to the metadata utilization condition, wherein the device security level of said information-processing apparatus is based on a number of secure storage units included in the at least one storage unit.

10. The information-processing system according to claim 1, wherein the metadata utilization condition further includes a number of times the operations may be performed on the metadata.

11. The information-processing system according to claim 1, wherein the metadata utilization condition further includes a time limit for performing the operations on the metadata.

12. The information-processing system according to claim 4, wherein the metadata utilization condition further includes a number of times the operations may be performed on the metadata.

13. The information-processing system according to claim 4, wherein the metadata utilization condition further includes a time limit for performing the operations on the metadata.

14. The information-processing system according to claim 8, wherein the metadata utilization condition further includes a number of times the operations may be performed on the metadata.

15. The information-processing system according to claim 8, wherein the metadata utilization condition further includes a time limit for performing the operations on the metadata.

* * * * *